(12) United States Patent
Nishio

(10) Patent No.: US 6,940,663 B2
(45) Date of Patent: Sep. 6, 2005

(54) ZOOM LENS SYSTEM

(75) Inventor: Akihiro Nishio, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/823,019

(22) Filed: Apr. 12, 2004

(65) Prior Publication Data
US 2004/0207930 A1 Oct. 21, 2004

(30) Foreign Application Priority Data
Apr. 18, 2003 (JP) ........................................ 2003-114326

(51) Int. Cl.⁷ ............................ G02B 9/12; G02B 15/14
(52) U.S. Cl. .................... 359/791; 359/784; 359/689
(58) Field of Search ................................. 359/791, 784, 359/687, 779, 767, 689, 766, 764, 757, 789, 772

(56) References Cited

U.S. PATENT DOCUMENTS

| | | | | |
|---|---|---|---|---|
| 5,172,273 A | 12/1992 | Yamanashi | ................... | 359/684 |
| 5,587,840 A | 12/1996 | Itoh | ........................... | 359/686 |
| 5,721,643 A | 2/1998 | Hagimori | .................... | 359/689 |
| 5,751,496 A | * 5/1998 | Hamano | ...................... | 359/677 |
| 5,793,535 A | 8/1998 | Ito et al. | ..................... | 359/689 |
| 6,278,845 B1 | * 8/2001 | Terada | ........................ | 396/175 |

FOREIGN PATENT DOCUMENTS

| | | |
|---|---|---|
| JP | 3-249614 | 11/1991 |
| JP | 4-338910 | 11/1992 |
| JP | 8-220438 | 8/1996 |
| JP | 8-262325 | 10/1996 |
| JP | 9-015499 | 1/1997 |
| JP | 9-120028 | 5/1997 |
| JP | 10-031155 | 2/1998 |

* cited by examiner

Primary Examiner—Timothy Thompson
(74) Attorney, Agent, or Firm—Morgan & Finnegan, LLP

(57) ABSTRACT

A compact zoom lens system allowing excellent image quality regardless of an object distance, is disclosed. The disclosed zoom lens system comprises, in order from an object side to an image side, a first, a second, and a third lens units having a positive, a positive, and a negative optical powers, respectively. The spacings between the first and second lens units and between the second and third lens units are changed during zooming. The second lens unit is constituted by, in order from the object to image side, a first lens subunit having a positive or negative optical power and a second lens subunit having a positive optical power. At least the second lens subunit is moved toward the object side to change the spacing between the first and second lens subunits during focusing on an object at a short distance from an object at infinity at least one zoom position.

11 Claims, 38 Drawing Sheets

SPHERICAL ABERRATION  ASTIGMATISM  DISTORTION  CHROMATIC ABERRATION OF MAGNIFICATION

SPHERICAL ABERRATION  ASTIGMATISM  DISTORTION  CHROMATIC ABERRATION OF MAGNIFICATION

SPHERICAL ABERRATION   ASTIGMATISM   DISTORTION

SPHERICAL ABERRATION   ASTIGMATISM   DISTORTION

SPHERICAL ABERRATION    ASTIGMATISM    DISTORTION

SPHERICAL ABERRATION    ASTIGMATISM    DISTORTION

SPHERICAL ABERRATION     ASTIGMATISM     DISTORTION

SPHERICAL ABERRATION     ASTIGMATISM     DISTORTION

SPHERICAL ABERRATION   ASTIGMATISM   DISTORTION   CHROMATIC ABERRATION OF MAGNIFICATION

SPHERICAL ABERRATION   ASTIGMATISM   DISTORTION   CHROMATIC ABERRATION OF MAGNIFICATION

SPHERICAL ABERRATION    ASTIGMATISM    DISTORTION

SPHERICAL ABERRATION    ASTIGMATISM    DISTORTION

SPHERICAL ABERRATION    ASTIGMATISM    DISTORTION

SPHERICAL ABERRATION    ASTIGMATISM    DISTORTION

SPHERICAL ABERRATION   ASTIGMATISM   DISTORTION

SPHERICAL ABERRATION   ASTIGMATISM   DISTORTION

SPHERICAL ABERRATION  ASTIGMATISM  DISTORTION  CHROMATIC ABERRATION OF MAGNIFICATION

SPHERICAL ABERRATION  ASTIGMATISM  DISTORTION  CHROMATIC ABERRATION OF MAGNIFICATION

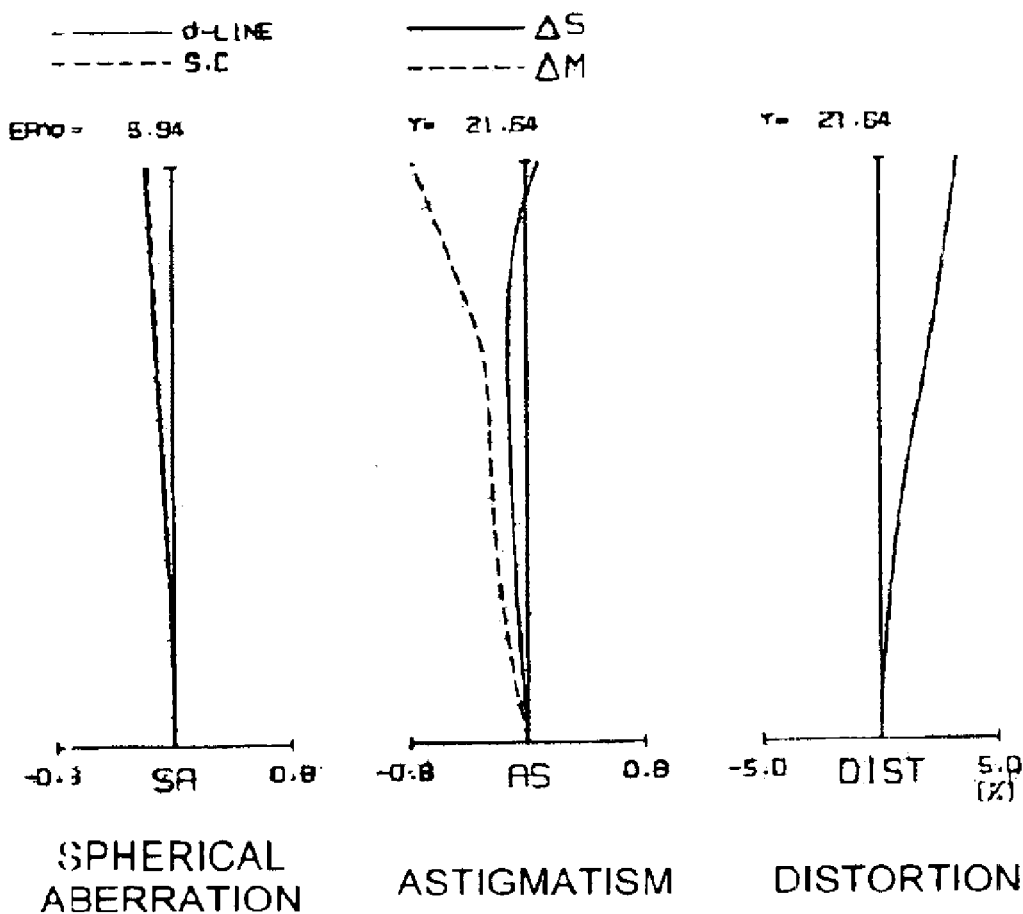

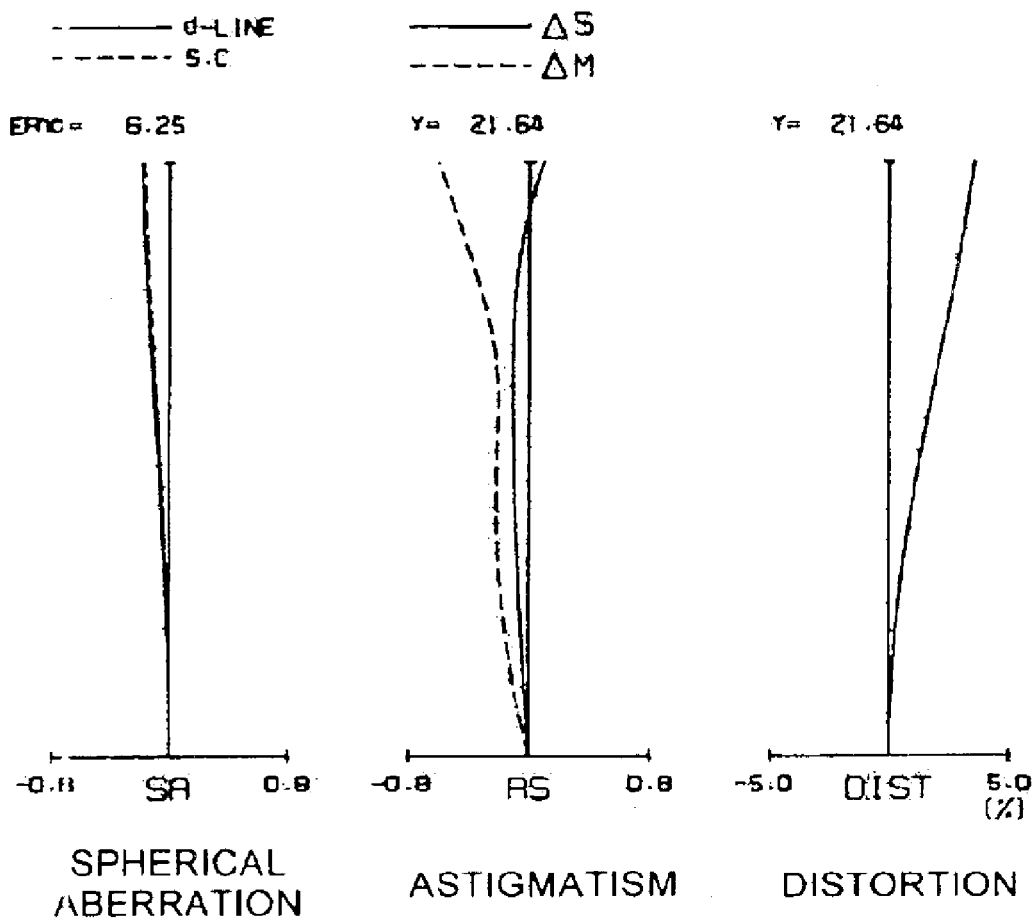

SPHERICAL ABERRATION  ASTIGMATISM  DISTORTION

SPHERICAL ABERRATION  ASTIGMATISM  DISTORTION

SPHERICAL ABERRATION | ASTIGMATISM | DISTORTION

SPHERICAL ABERRATION | ASTIGMATISM | DISTORTION

FIG.20A
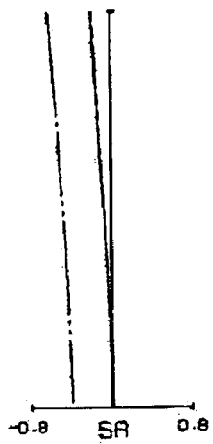
SPHERICAL
ABERRATION
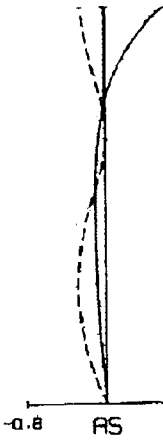
ASTIGMATISM
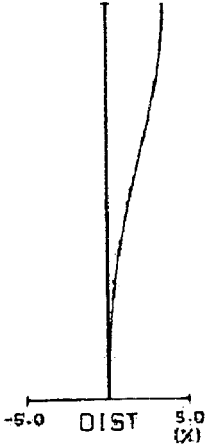
DISTORTION
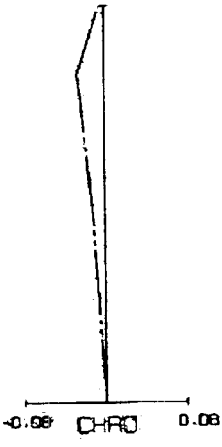
CHROMATIC
ABERRATION OF
MAGNIFICATION
FIG.20B
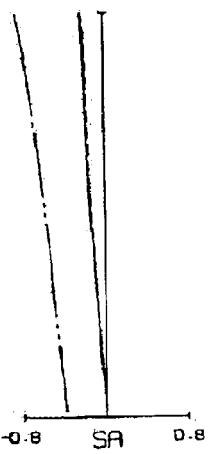
SPHERICAL
ABERRATION
ASTIGMATISM
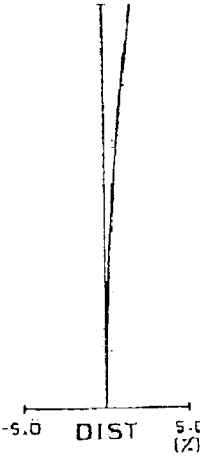
DISTORTION
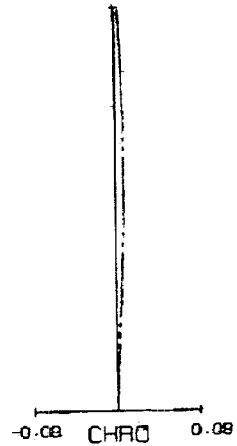
CHROMATIC
ABERRATION OF
MAGNIFICATION

SPHERICAL ABERRATION  ASTIGMATISM  DISTORTION

SPHERICAL ABERRATION  ASTIGMATISM  DISTORTION

SPHERICAL ABERRATION  ASTIGMATISM  DISTORTION

SPHERICAL ABERRATION  ASTIGMATISM  DISTORTION

SPHERICAL ABERRATION  ASTIGMATISM  DISTORTION

SPHERICAL ABERRATION  ASTIGMATISM  DISTORTION

SPHERICAL ABERRATION    ASTIGMATISM    DISTORTION

SPHERICAL ABERRATION    ASTIGMATISM    DISTORTION

SPHERICAL ABERRATION  ASTIGMATISM  DISTORTION  CHROMATIC ABERRATION OF MAGNIFICATION

SPHERICAL ABERRATION  ASTIGMATISM  DISTORTION  CHROMATIC ABERRATION OF MAGNIFICATION

SPHERICAL ASTIGMATISM DISTORTION CHROMATIC
ABERRATION ABERRATION OF
MAGNIFICATION

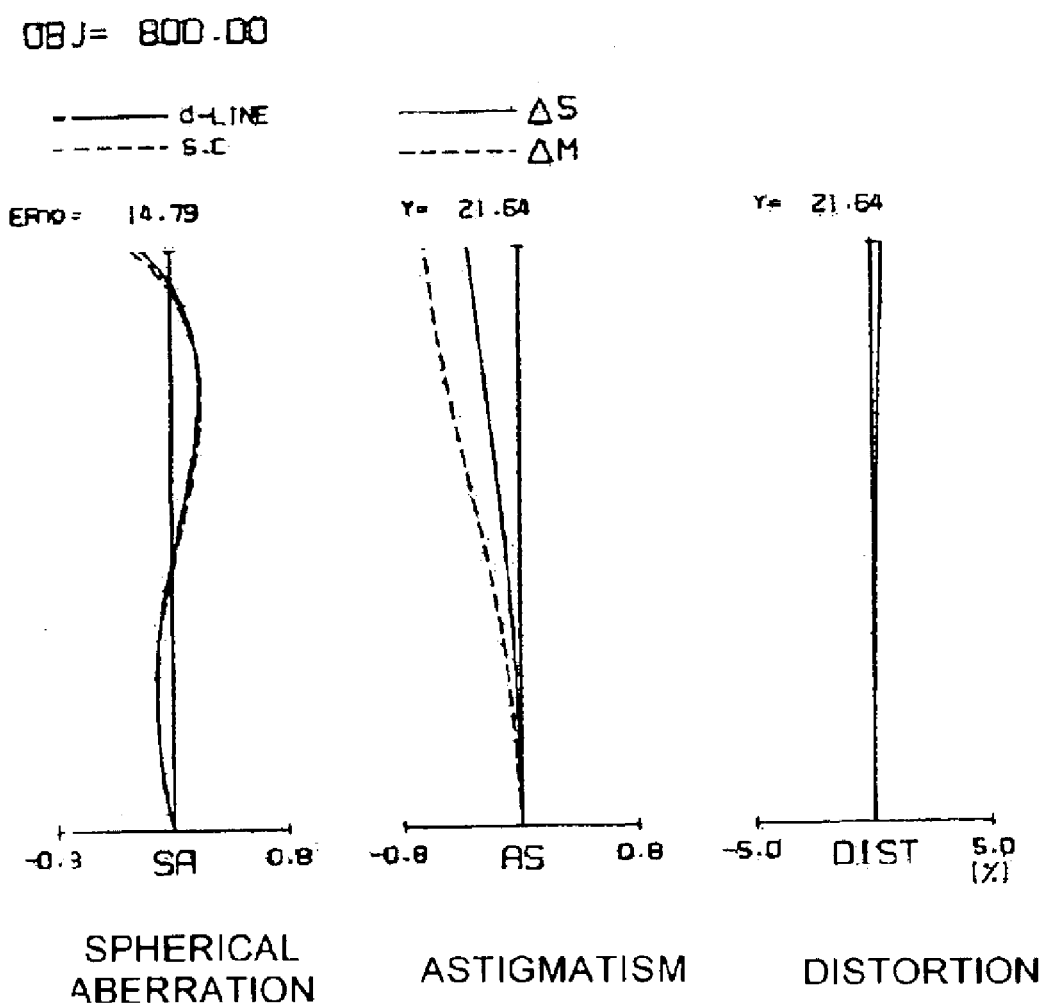

SPHERICAL ABERRATION | ASTIGMATISM | DISTORTION

SPHERICAL ABERRATION | ASTIGMATISM | DISTORTION

SPHERICAL ABERRATION  ASTIGMATISM  DISTORTION

SPHERICAL ABERRATION  ASTIGMATISM  DISTORTION

ZOOM LENS SYSTEM

BACKGROUND OF THE INVENTION

1. Field of the Invention

The present invention relates to a zoom lens system, and more particularly, to a zoom lens system preferable for use as an image-taking optical system of a camera.

2. Description of the Related Art

In recent years, more compact image-taking optical systems with higher performance are needed as image-taking systems for cameras.

Especially for an image-taking optical system of a lens shutter camera, a reduced size of such a camera is becoming possible with the aid of technical progress of associated mechanisms and electrical circuits, so that a zoom lens system achieving a higher zoom ratio and a smaller size at the same time is desired as an optical system of the camera.

As an image-taking optical system for a lens shutter camera, Japanese Patent Application Laid-Open No. H8(1996)-262325 (corresponding to U.S. Pat. No. 5,721, 643), Japanese Patent Application Laid-Open No. H9(1997)-120028 (corresponding to U.S. Pat. No. 5,793, 535) and the like have proposed a zoom lens which is formed of three lens units having a positive refractive power, a positive refractive power, and a negative refractive power, respectively, in order from an object side.

Japanese Patent Application Laid-Open No. H9(1997)-15499 (corresponding to U.S. Pat. No. 5,587,840) and Japanese Patent Application Laid-Open No. H10(1998)-031155 have also proposed a zoom lens which provides a zoom ratio of approximately three to four and is formed of four lens units having a negative, a positive, a positive, and a negative refractive powers, in order from an object side.

In addition, Japanese Patent Application Laid-Open No. H4(1992)-338910, Japanese Patent Application Laid-Open No. H8(1996)-220438 and the like have proposed a focusing method for reducing variations in aberration when images of an object at a short distance are taken.

Japanese Patent Application Laid-Open No. H3(1991)-249614 (corresponding to U.S. Pat. No. 5,172,273) has proposed a zoom lens system which is formed of four lens units having a positive, a positive, a positive, and a negative refractive powers in order from an object side, as well as a method of moving a second lens unit and a third lens unit together and a method of moving a fourth lens unit as a focusing method using one or more lens units other than a first lens unit.

When attempts are made to realize a zoom lens system which provides a higher zoom ratio and has a smaller size, however, optical performance is likely to change at the time of focusing. It is difficult to achieve favorable optical performance over the entire zoom range while such changes in optical performance are suppressed.

SUMMARY OF THE INVENTION

It is an object of the present invention to provide a compact zoom lens system which can maintain excellent image quality even in an image-taking for a short distance object by appropriately setting a zoom lens structure and lens unit arrangement and making improvements to how lens units are moved at the time of focusing.

According to an illustrative embodiment, the present invention provides a zoom lens system which comprises, in order from an object side to an image side, a first lens unit having a positive optical power, a second lens unit having a positive optical power, and a third lens unit having a negative optical power. The spacing between the first lens unit and the second lens unit and the spacing between the second lens unit and the third lens unit are changed during zooming. The second lens unit comprises, in order from the object side to the image side, a first lens subunit having a positive or negative optical power and a second lens subunit having a positive optical power. At least the second lens subunit is moved toward the object side such that the spacing between the first lens subunit and the second lens subunit is changed during focusing on an object at a short distance from an object at infinity at least one zoom position.

BRIEF DESCRIPTION OF THE DRAWINGS

FIG. 15 shows various types of aberration in the zoom lens system of Numerical Example 3 at the wide-angle end when an object located at a distance of 80 centimeters is brought into focus (in the direct driving method) with the spacing being changed between a first lens subunit and a second lens subunit;

FIG. 16 shows various types of aberration in the zoom lens system of Numerical Example 3 at the wide-angle end when an object located at a distance of 80 centimeters is brought into focus (in the zoom cam using method) with the spacing being changed between the first lens subunit and the second lens subunit;

FIGS. 20(A), 20(B), and 20(C) show various types of aberration in the zoom lens system of Numerical Example 4 at the wide-angle end, intermediate zoom position, and telephoto end, respectively, when the zoom lens system is focused on an object at infinity;

FIG. 27 shows various types of aberration in the zoom lens system of Numerical Example 2 at the telephoto end when an object located at a distance of 80 centimeters is brought into focus (in the direct driving method) with the spacing being changed between a first lens subunit and a second lens subunit;

DETAILED DESCRIPTION OF THE PREFERRED EMBODIMENTS

Figure 1:
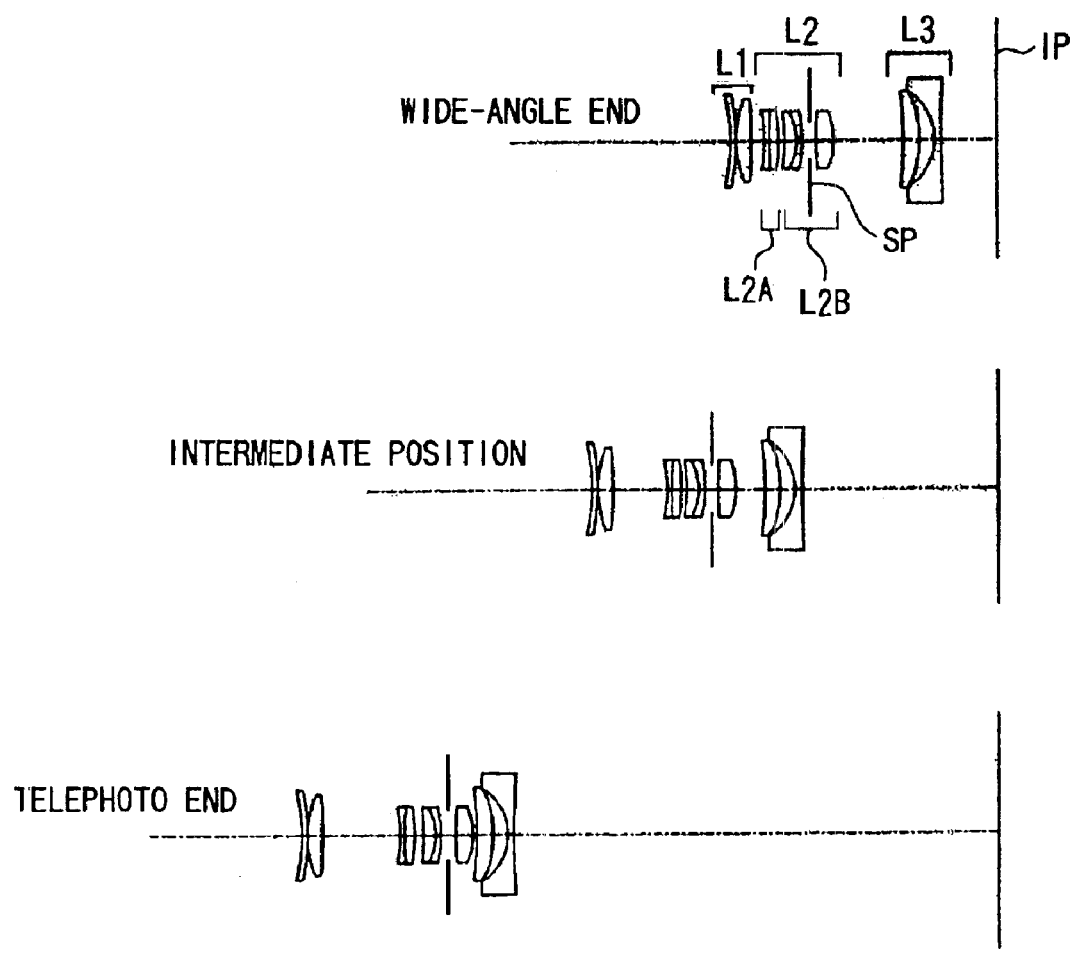
FIG. 1 shows the structure of lenses of a zoom lens system of Numerical Example 1.
Figure 2A:
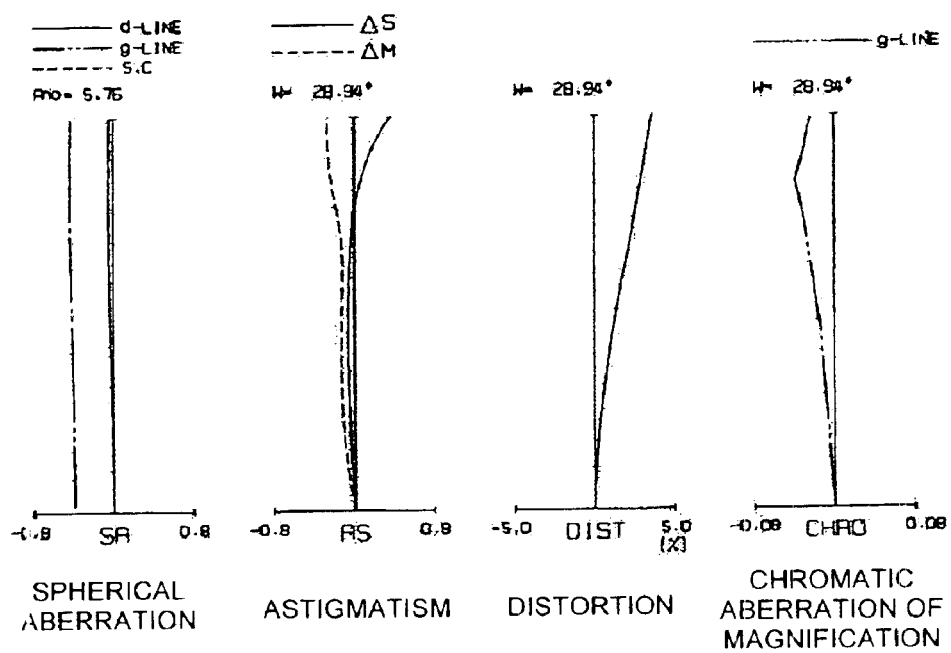
FIGS. 2(A), 2(B), and 2(C) show various types of aberration in the zoom lens system of Numerical Example 1 at the wide-angle end, intermediate zoom position, and telephoto end, respectively, when the zoom lens system is focused on an object at infinity.
Figure 2B:
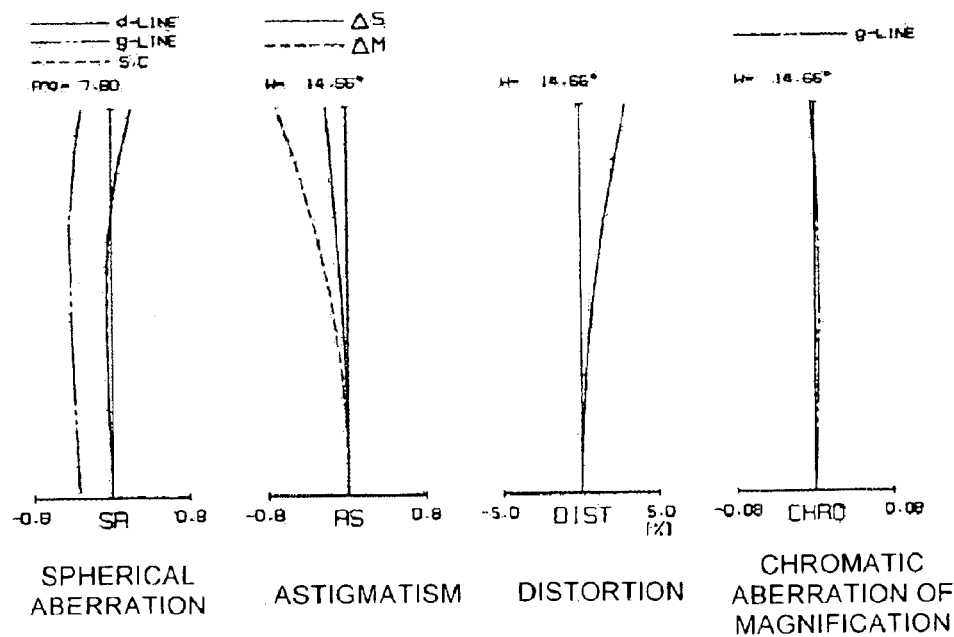
Figure 2C:
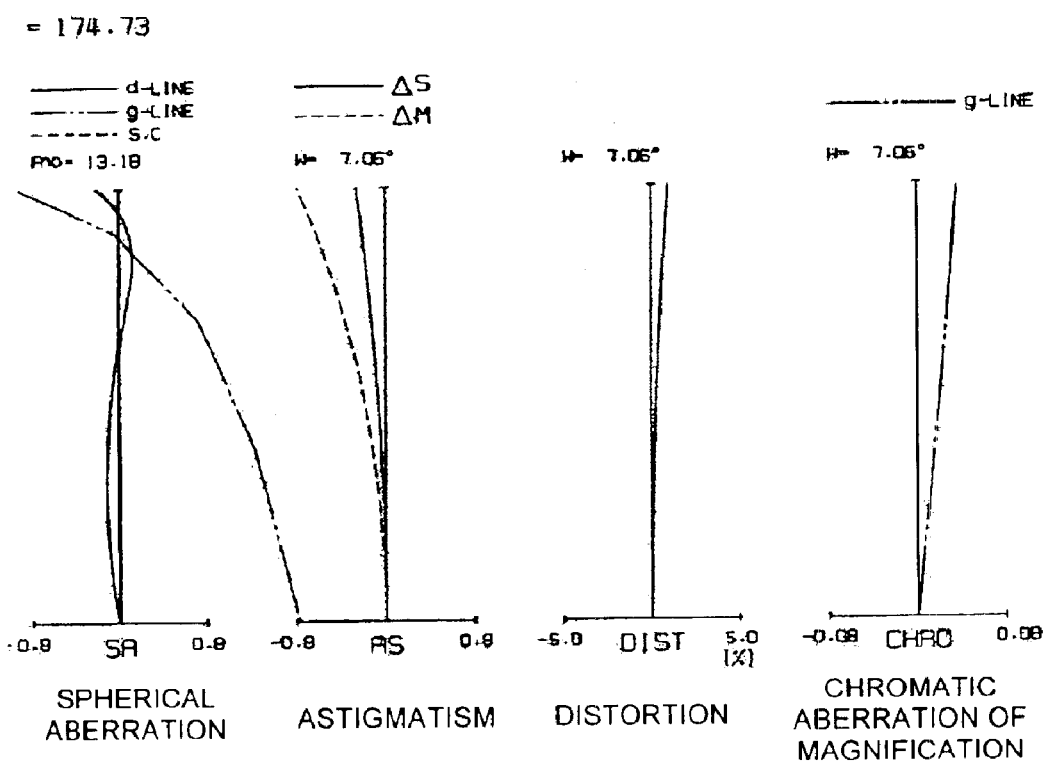
Figure 3A:
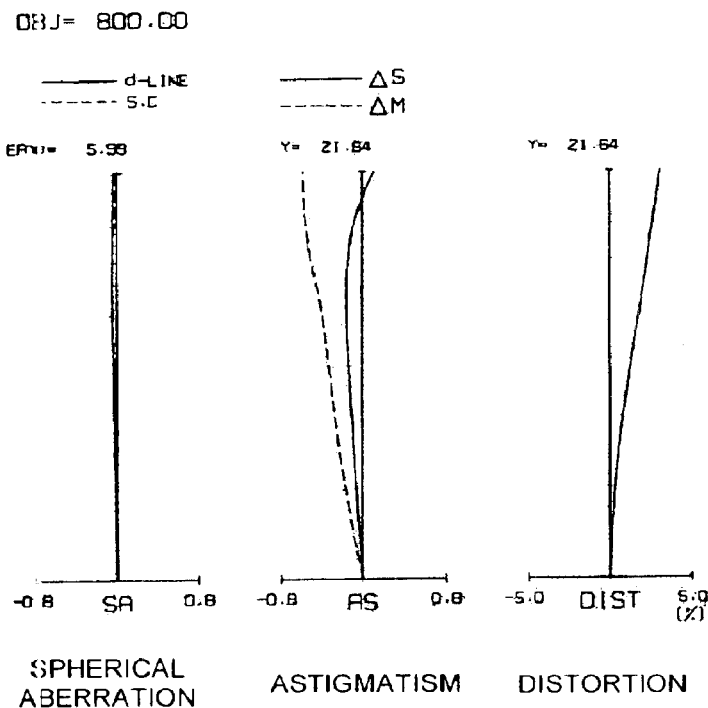
FIGS. 3(A) and 3(B) show various types of aberration in the zoom lens system of Numerical Example 1 at the wide-angle end and telephoto end, respectively, when an object located at a distance of 80 centimeters is brought into focus (in a direct driving method) with the spacing being changed between a first lens subunit and a second lens subunit.
Figure 3B:
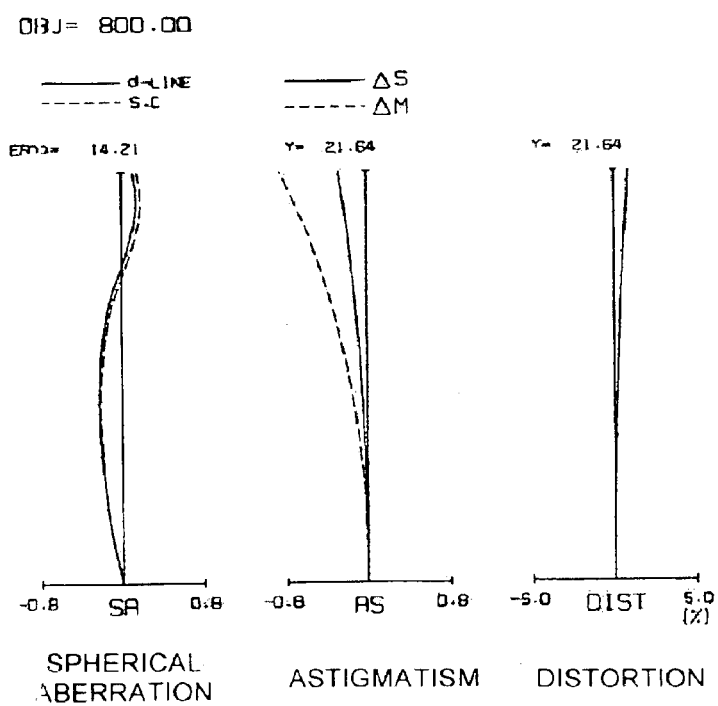
Figure 4A:
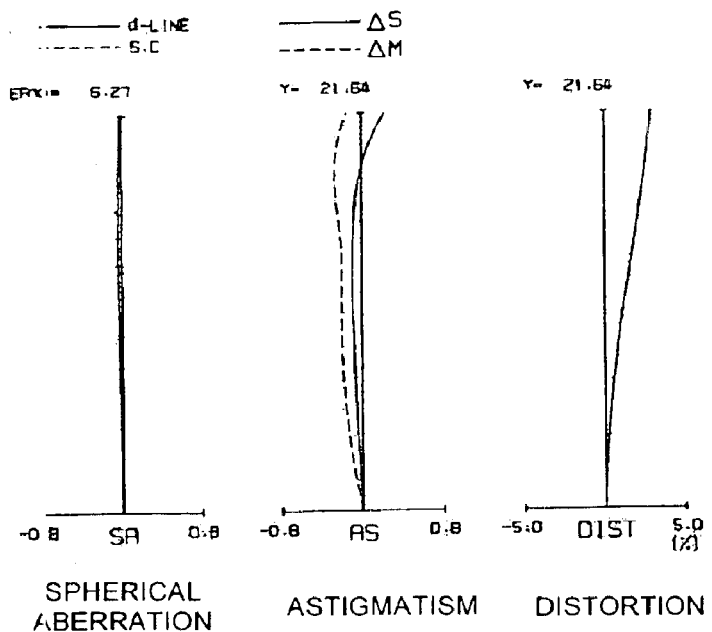
FIGS. 4(A) and 4(B) show various types of aberration in the zoom lens system of Numerical Example 1 at the wide-angle end and telephoto end, respectively, when an object located at a distance of 80 centimeters is brought into focus (in a zoom cam method) with the spacing being changed between the first lens subunit and the second lens subunit.
Figure 4B:
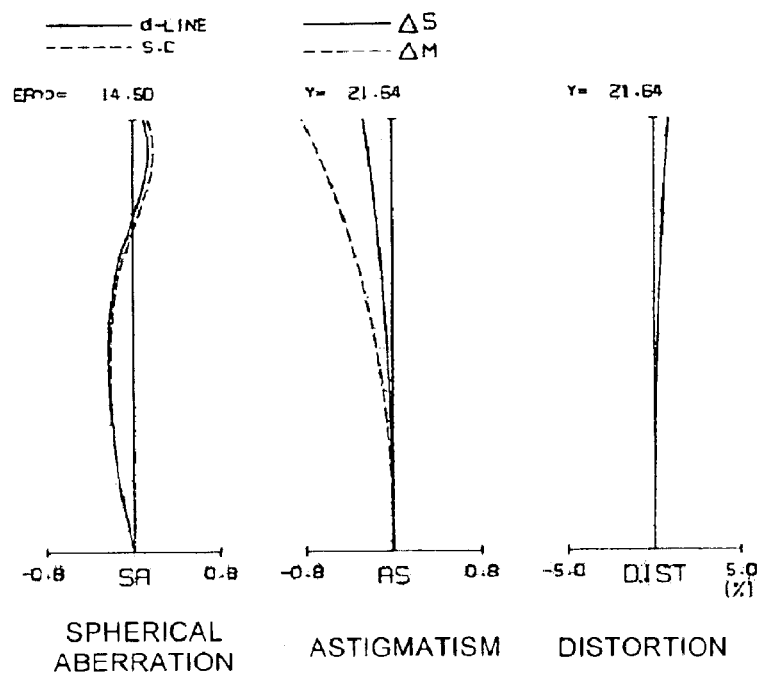
Figure 5A:
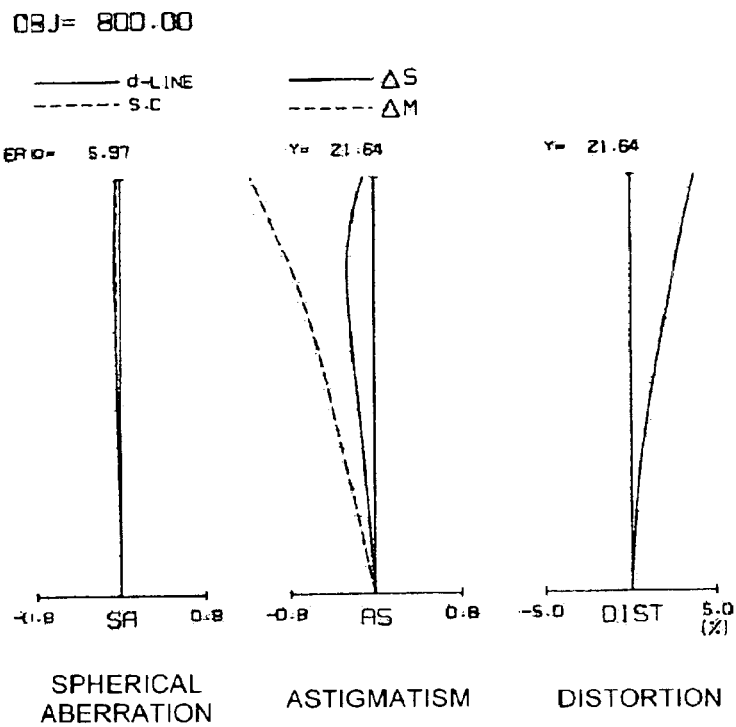
FIGS. 5(A) and 5(B) show various types of aberration in the zoom lens system of Numerical Example 1 at the wide-angle end and telephoto end, respectively, when an object located at a distance of 80 centimeters is brought into focus (in the direct driving method) without changing the spacing between the first lens subunit and the second lens subunit, as a comparative example.
Figure 5B:
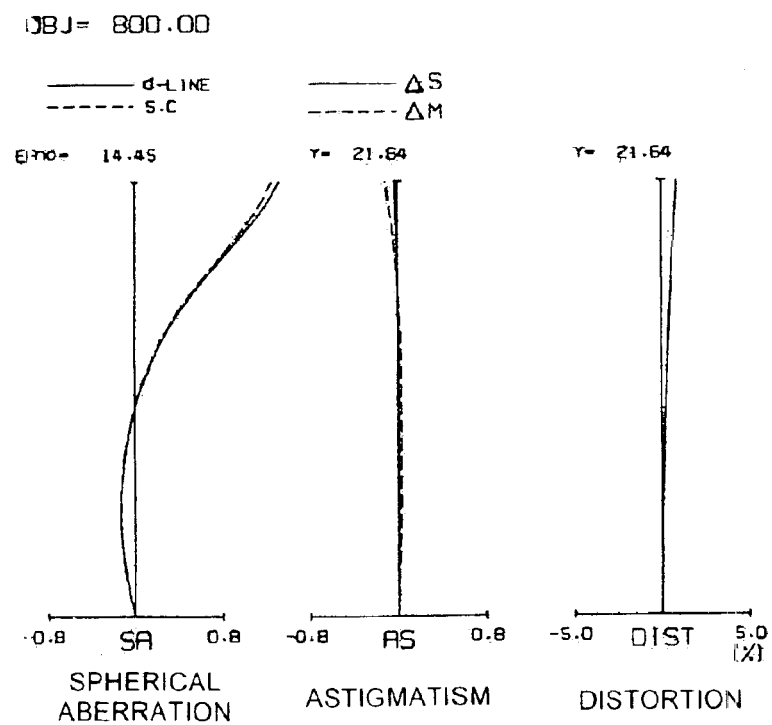
Figure 6A:
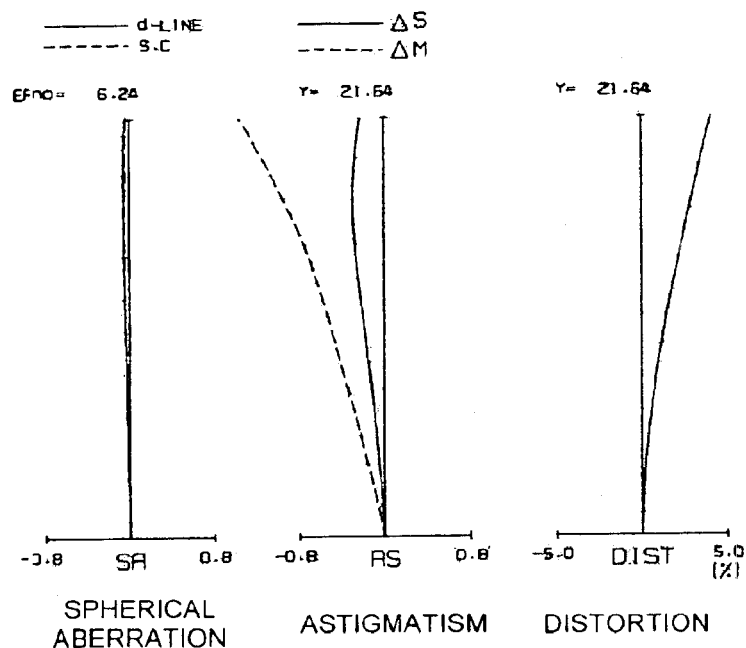
FIGS. 6(A) and 6(B) show various types of aberration in the zoom lens system of Numerical Example 1 at the wide-angle end and telephoto end, respectively, when an object located at a distance of 80 centimeters is brought into focus (in the zoom cam using method) without changing the spacing between the first lens subunit and the second lens subunit, as a comparative example.
Figure 6B:
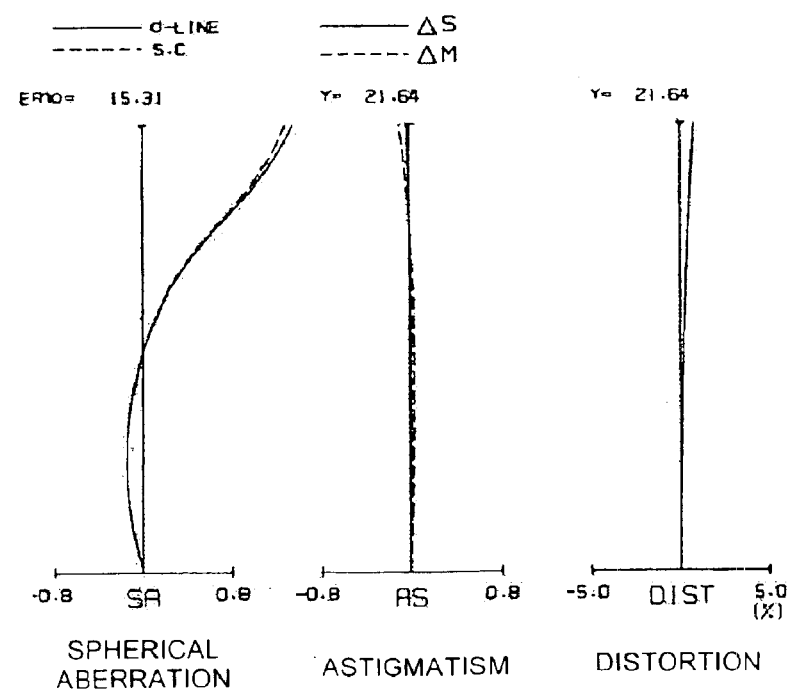
Figure 7:
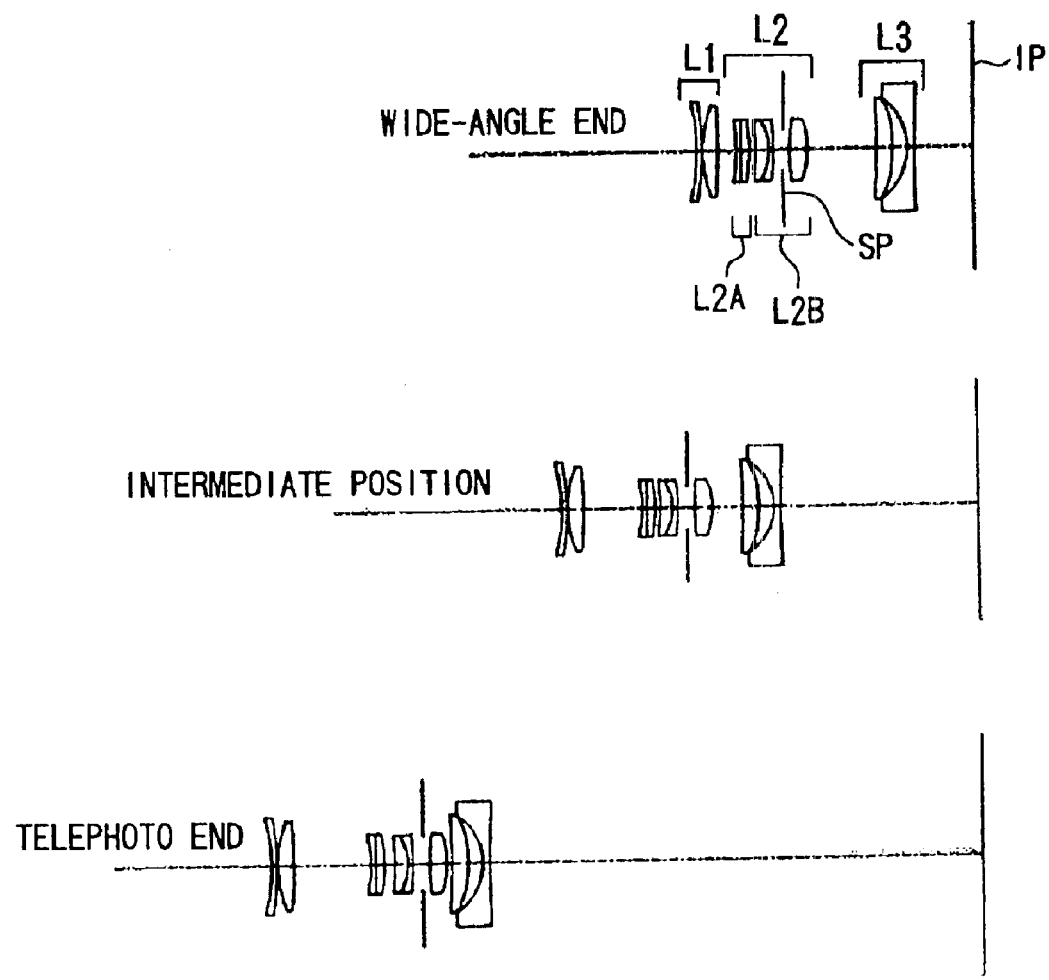
FIG. 7 shows the structure of lenses of a zoom lens system of Numerical Example 2.
Figure 8A:
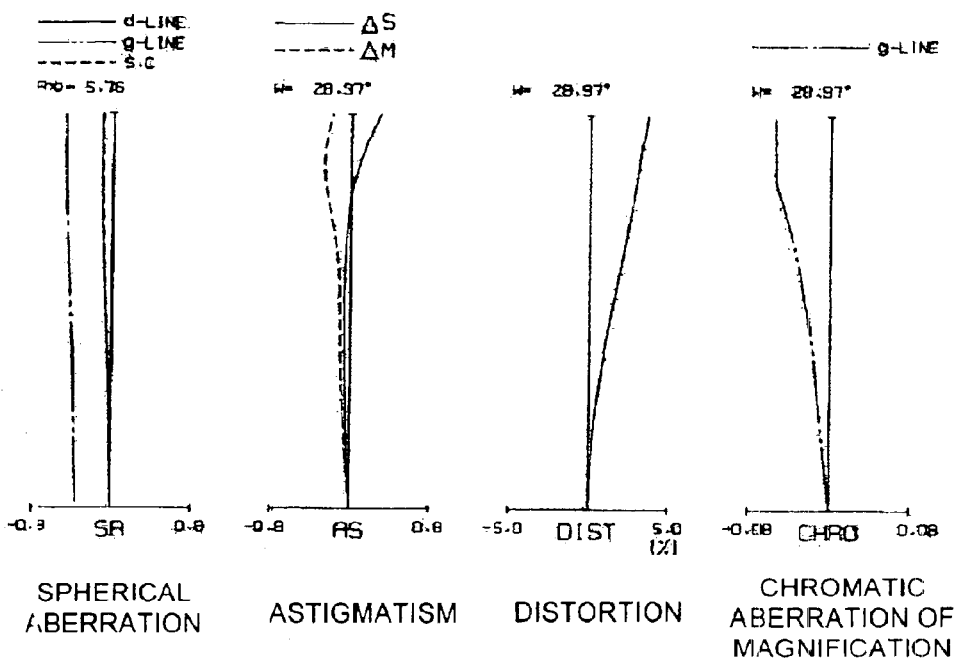
FIGS. 8(A), 8(B), and 8(C) show various types of aberration in the zoom lens system of Numerical Example 2 at the wide-angle end, intermediate zoom position, and telephoto end, respectively, when the zoom lens system is focused on an object at infinity.
Figure 8B:
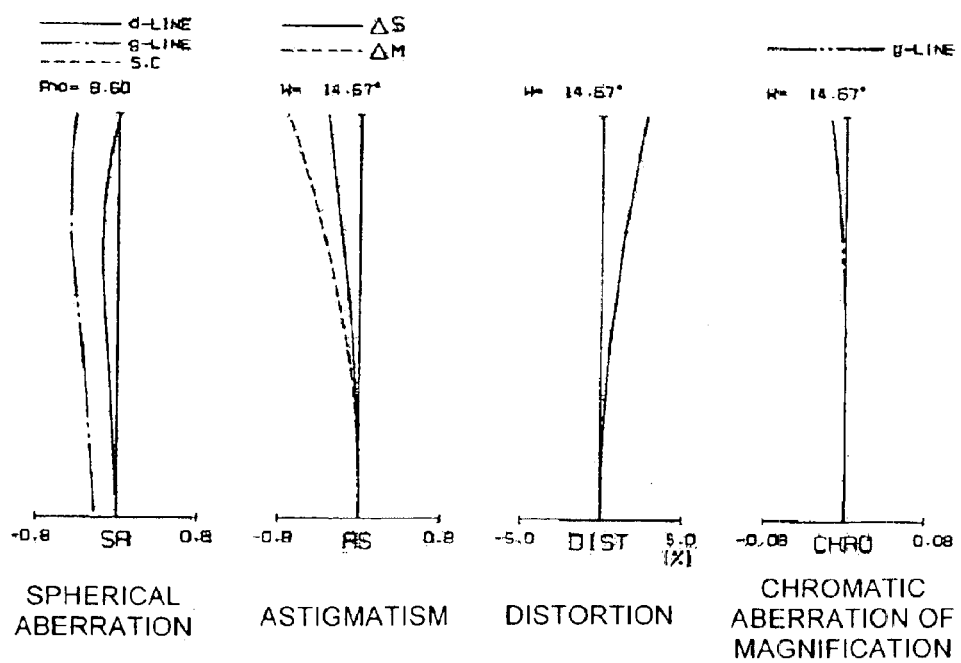
Figure 8C:
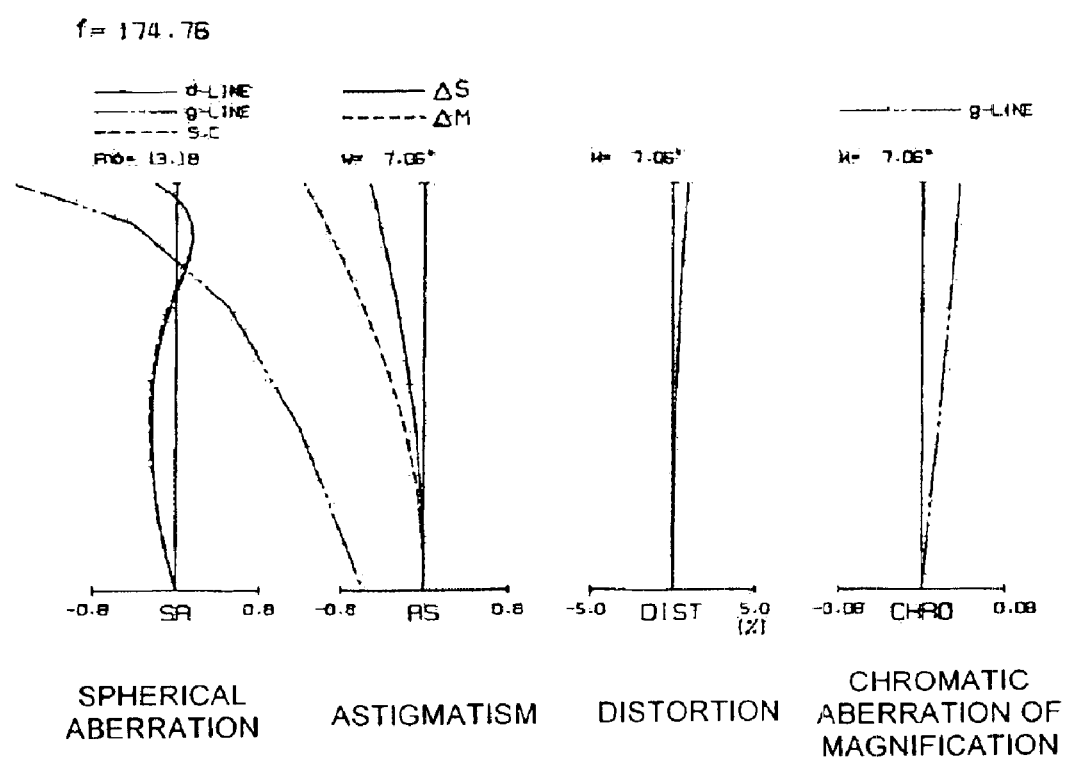
Figure 9A:
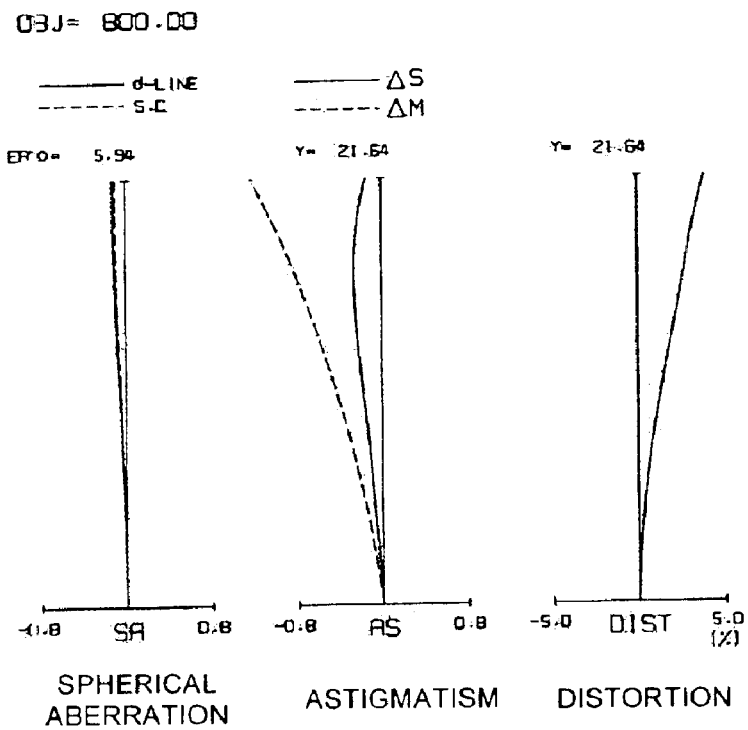
FIGS. 9(A) and 9(B) show various types of aberration in the zoom lens system of Numerical Example 2 at the wide-angle end and telephoto end, respectively, when an object located at a distance of 80 centimeters is brought into focus (in the direct driving method) with the spacing being changed between a first lens subunit and a second lens subunit.
Figure 9B:
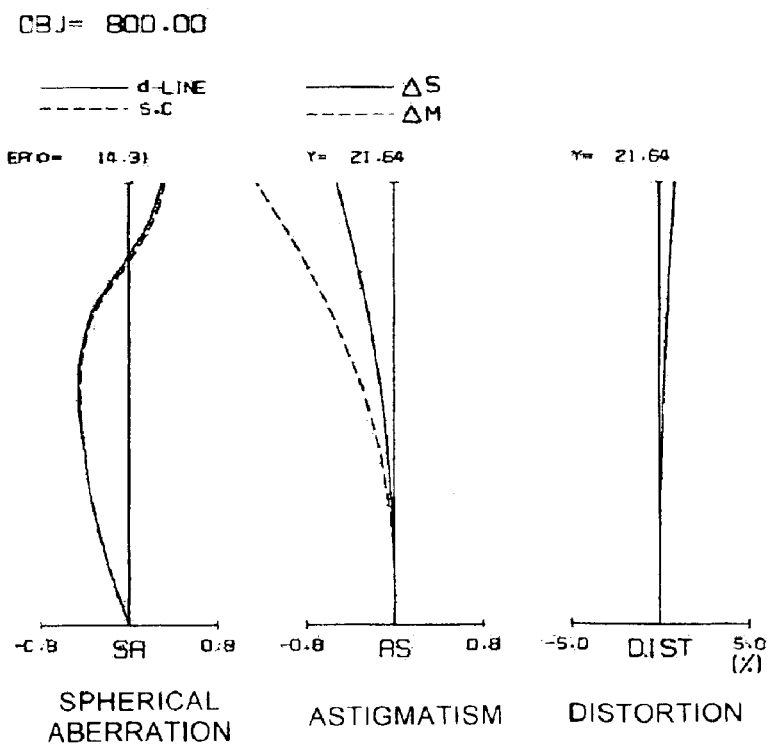
Figure 10A:
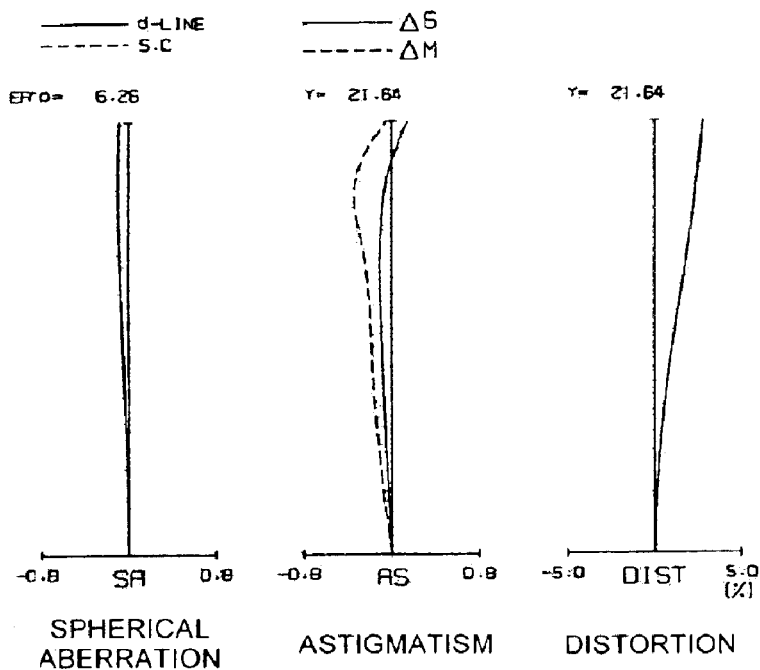
FIGS. 10(A) and 10(B) show various types of aberration in the zoom lens system of Numerical Example 2 at the wide-angle end and telephoto end, respectively, when an object located at a distance of 80 centimeters is brought into focus (in the zoom cam using method) with the spacing being changed between the first lens subunit and the second lens subunit.
Figure 10B:
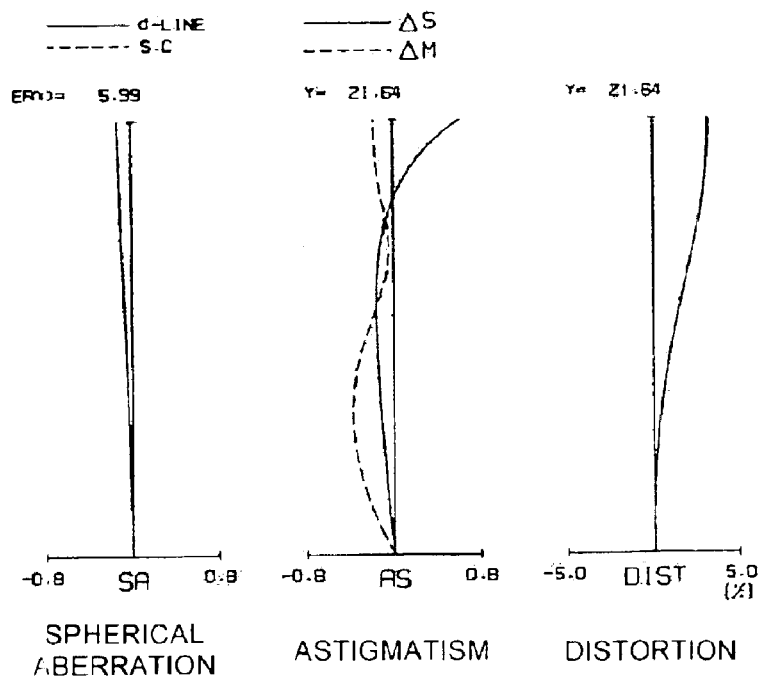
Figure 11A:
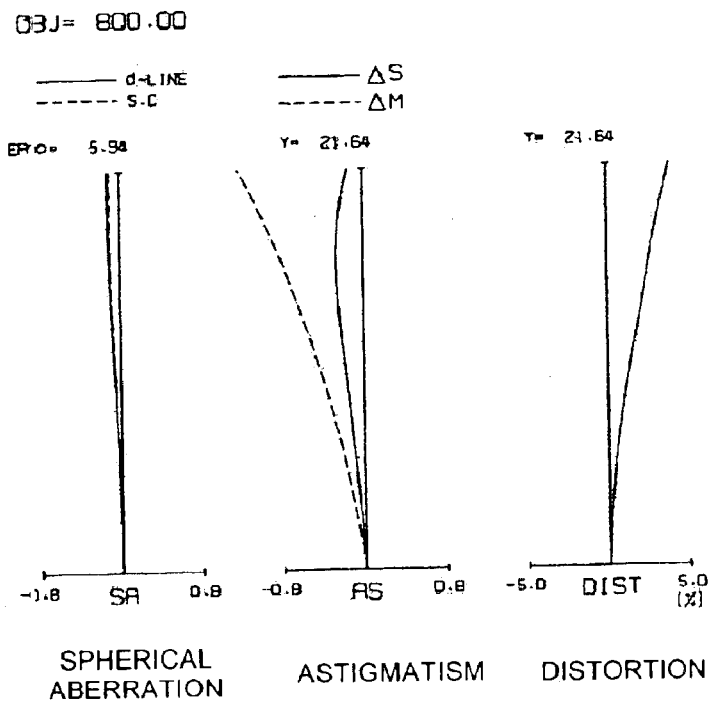
FIGS. 11(A) and 11(B) show various types of aberration in the zoom lens system of Numerical Example 2 at the wide-angle end and telephoto end, respectively, when an object located at a distance of 80 centimeters is brought into focus (in the direct driving method) without changing the spacing between the first lens subunit and the second lens subunit, as a comparative example.
Figure 11B:
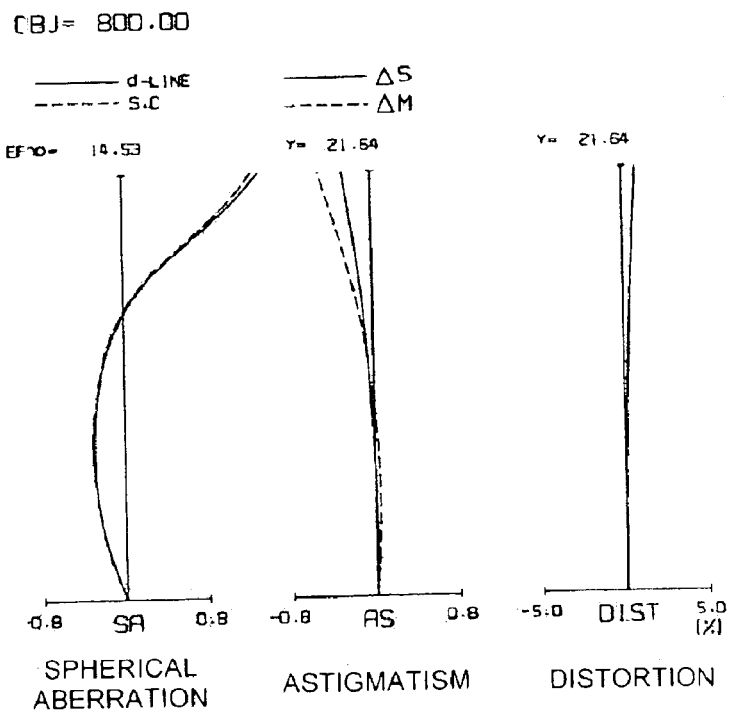
Figure 12A:
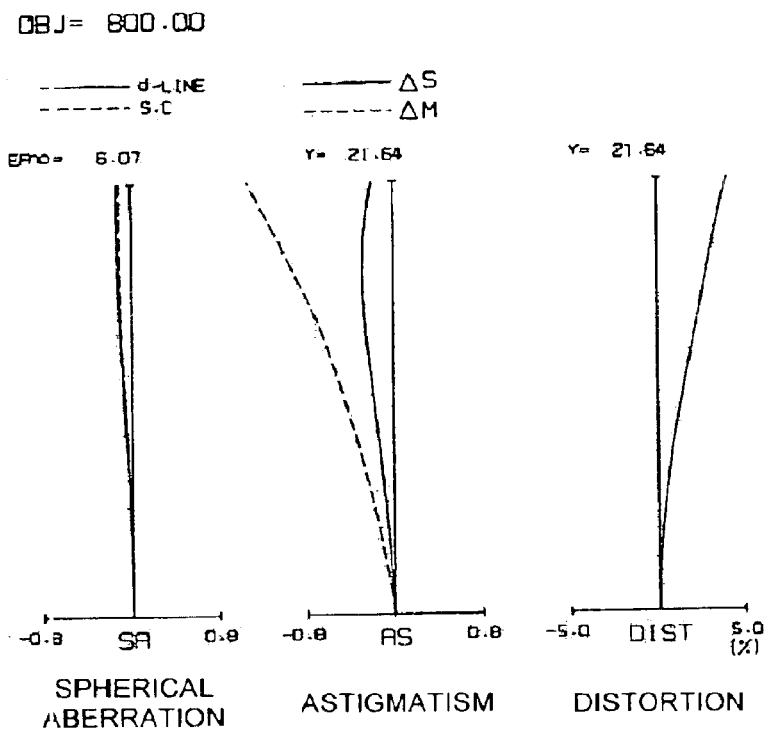
FIGS. 12(A) and 12(B) show various types of aberration in the zoom lens system of Numerical Example 2 at the wide-angle end and telephoto end, respectively, when an object located at a distance of 80 centimeters is brought into focus (in the zoom cam using method) without changing the spacing between the first lens subunit and the second lens subunit, as a comparative example.
Figure 12B:
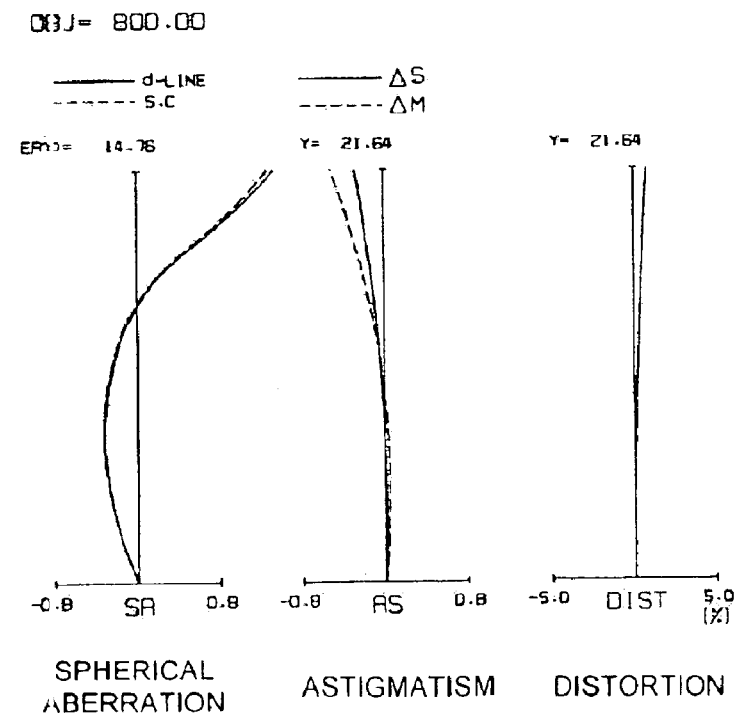
Figure 13:
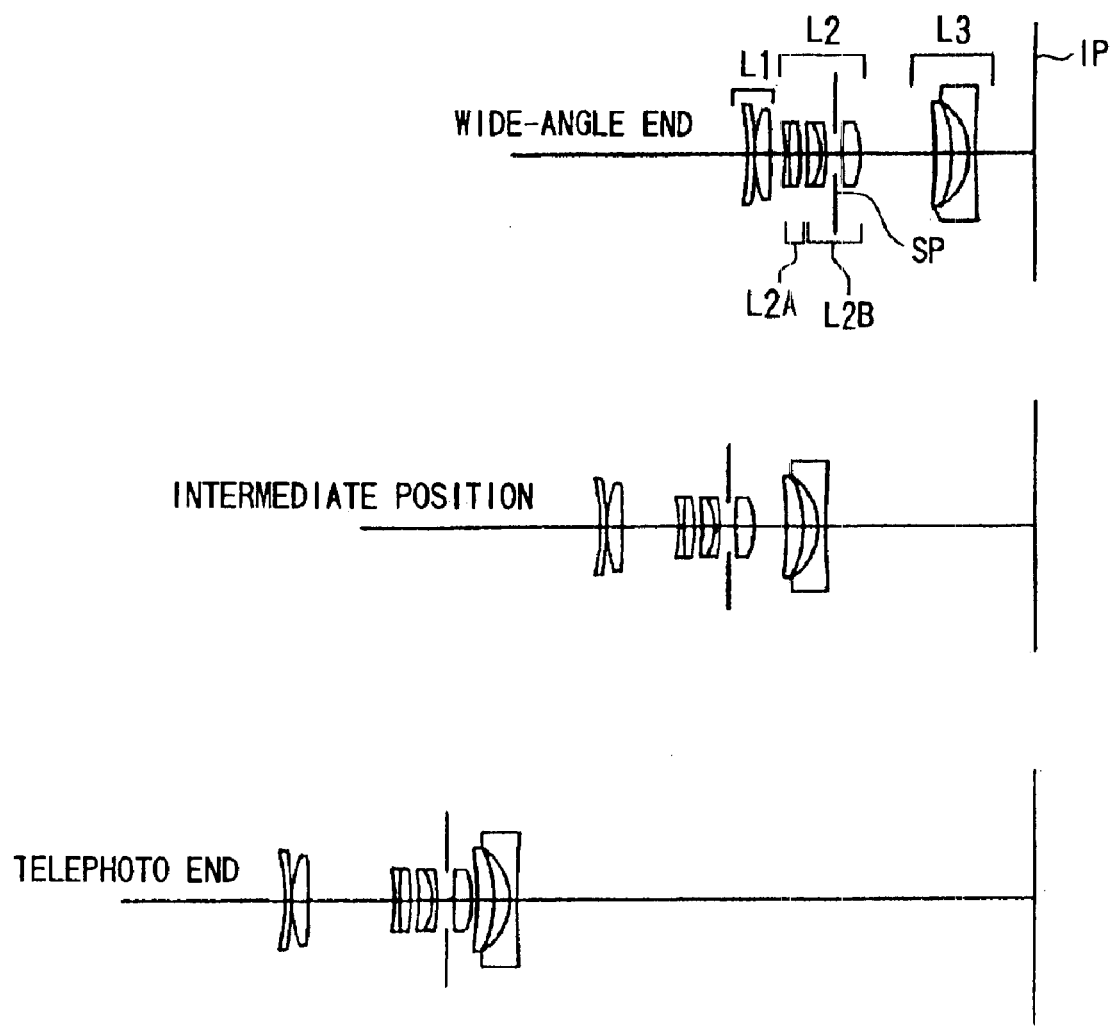
FIG. 13 shows the structure of lenses of a zoom lens system of Numerical Example 3.
Figure 14A:
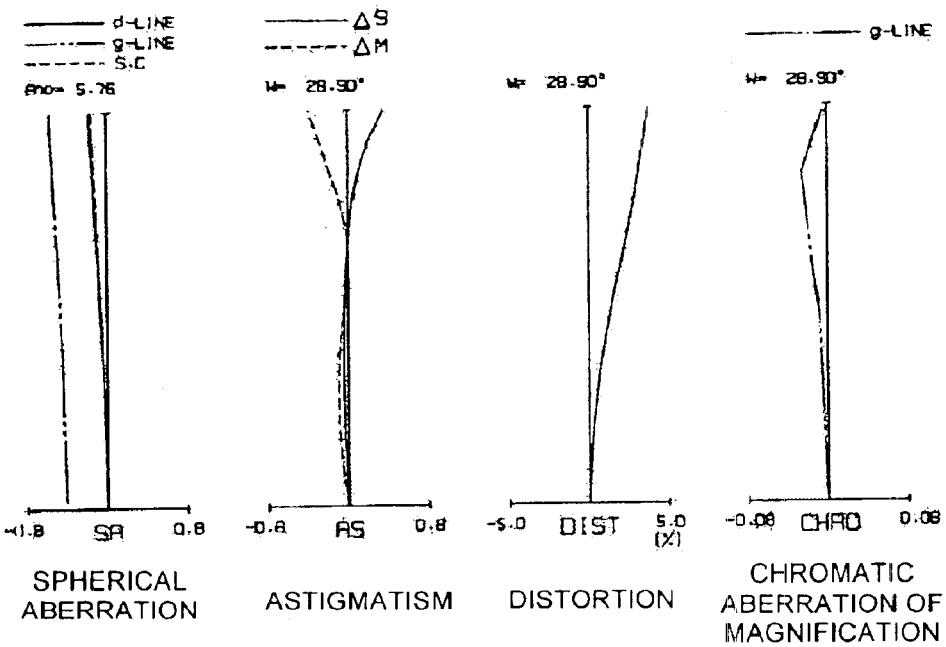
FIGS. 14(A), 14(B), and 14(C) show various types of aberration in the zoom lens system of Numerical Example 3 at the wide-angle end, intermediate zoom position, and telephoto end, respectively, when the zoom lens system is focused on an object at infinity.
Figure 14B:
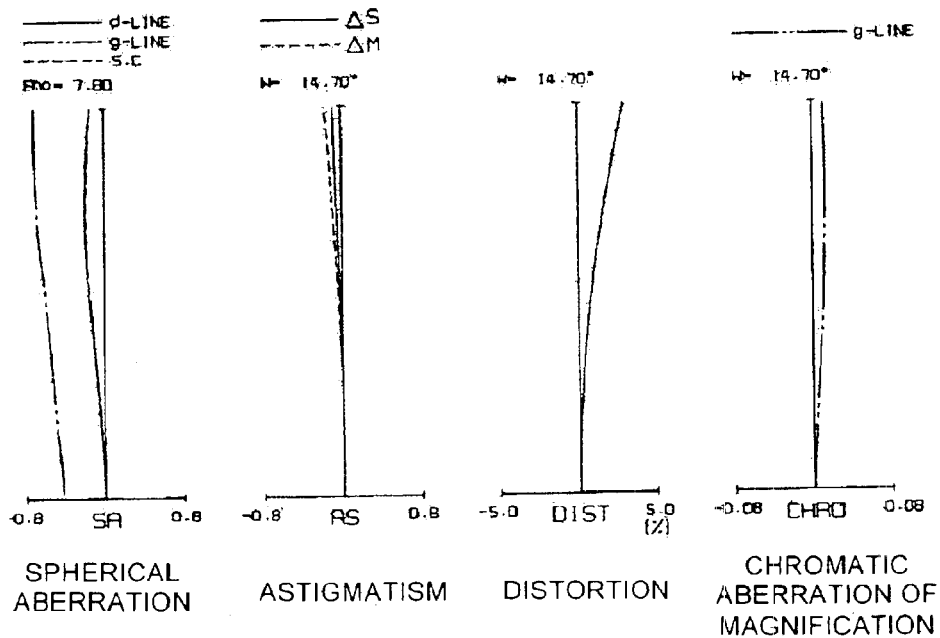
Figure 14C:
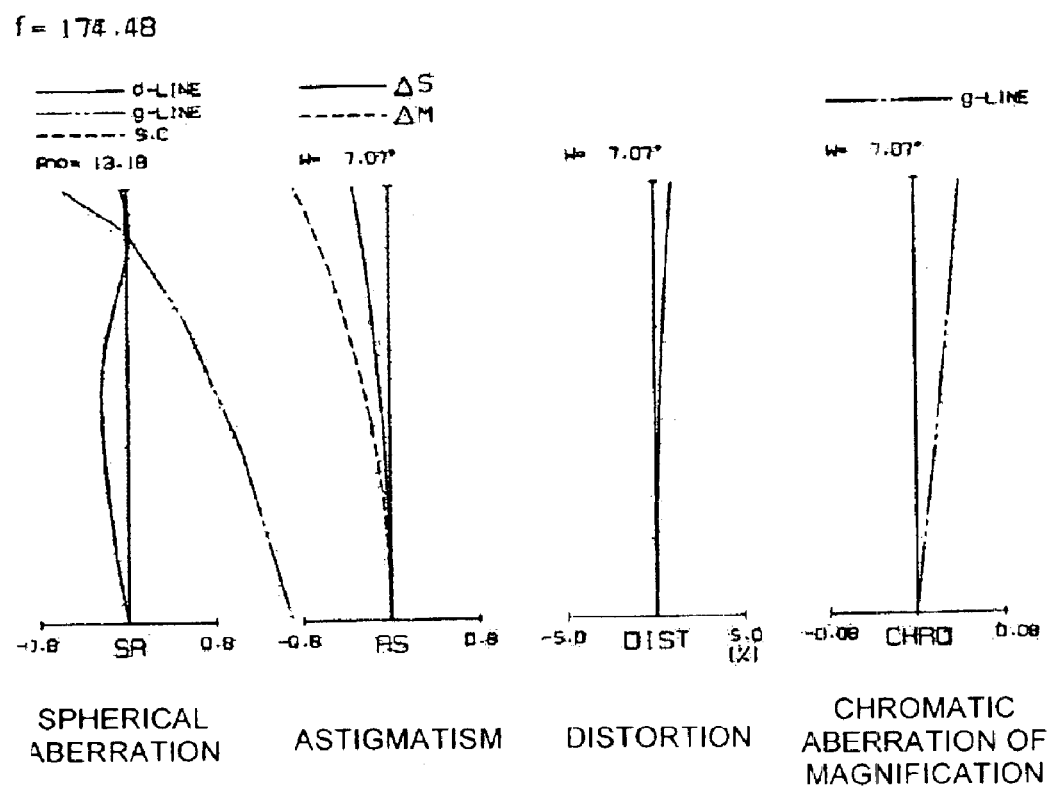
Figure 17A:
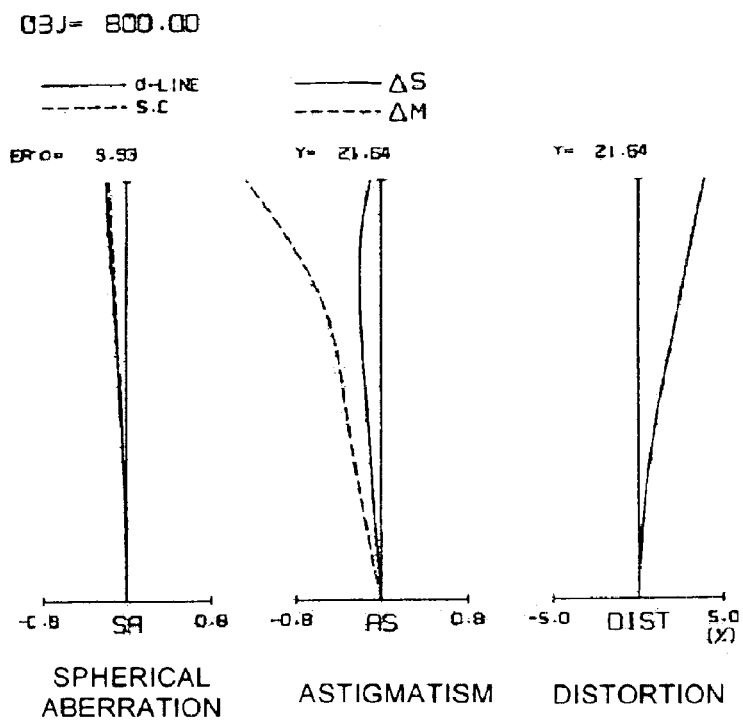
FIGS. 17(A) and 17(B) show various types of aberration in the zoom lens system of Numerical Example 3 at the wide-angle end and telephoto end, respectively, when an object located at a distance of 80 centimeters is brought into focus (in the direct driving method) without changing the spacing between the first lens subunit and the second lens subunit, as a comparative example.
Figure 17B:
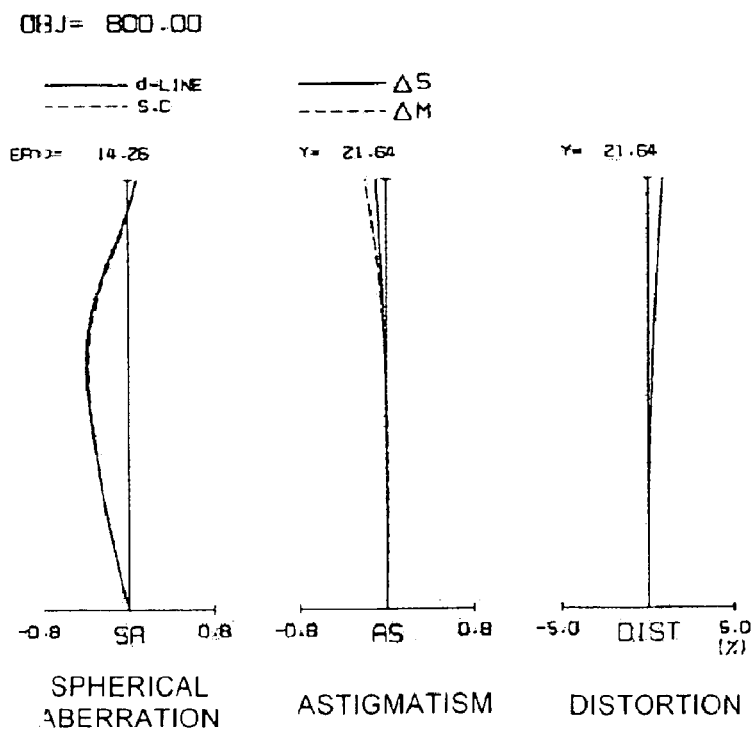
Figure 18A:
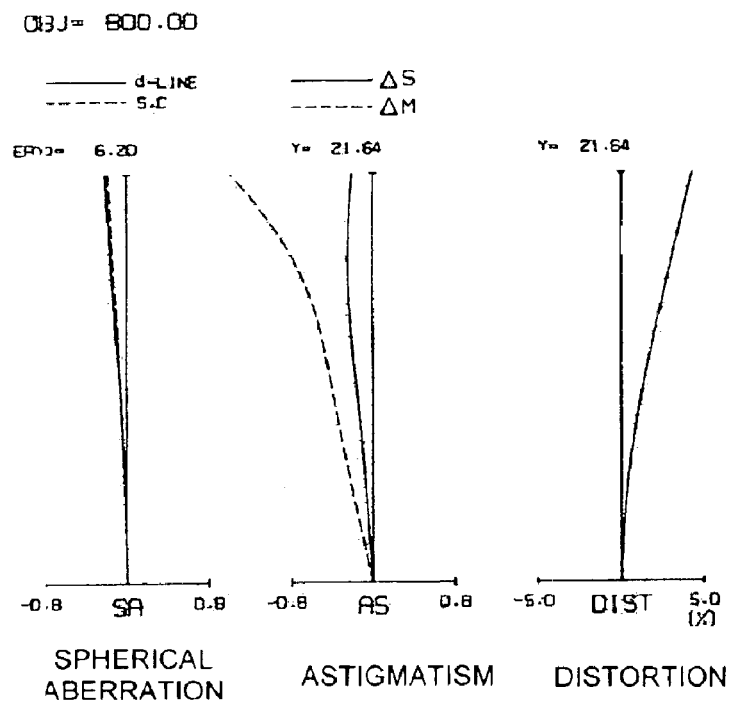
FIGS. 18(A) and 18(B) show various types of aberration in the zoom lens system of Numerical Example 3 at the wide-angle end and telephoto end, respectively, when an object located at a distance of 80 centimeters is brought into focus (in the zoom cam using method) without changing the spacing between the first lens subunit and the second lens subunit, as a comparative example.
Figure 18B:
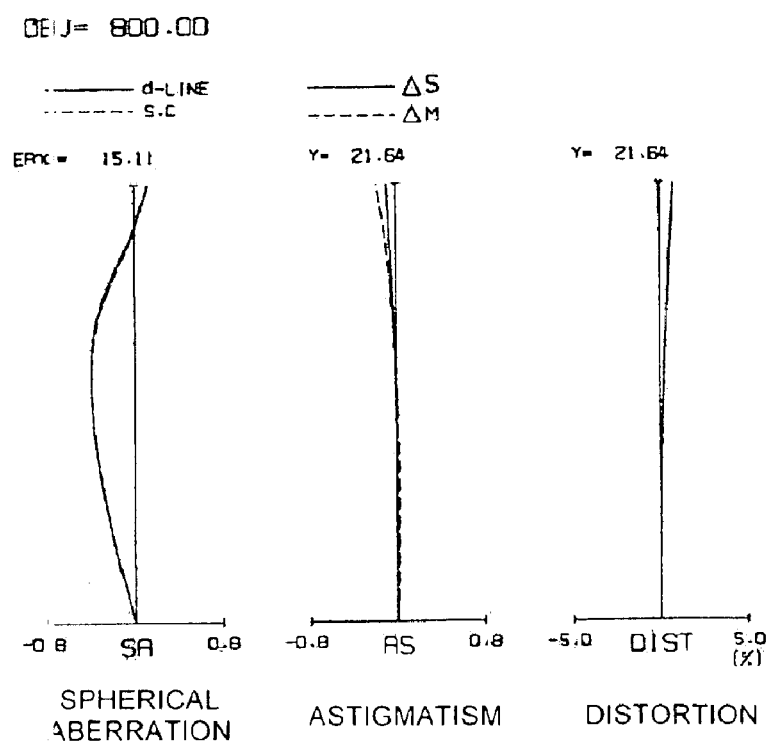
Figure 19:
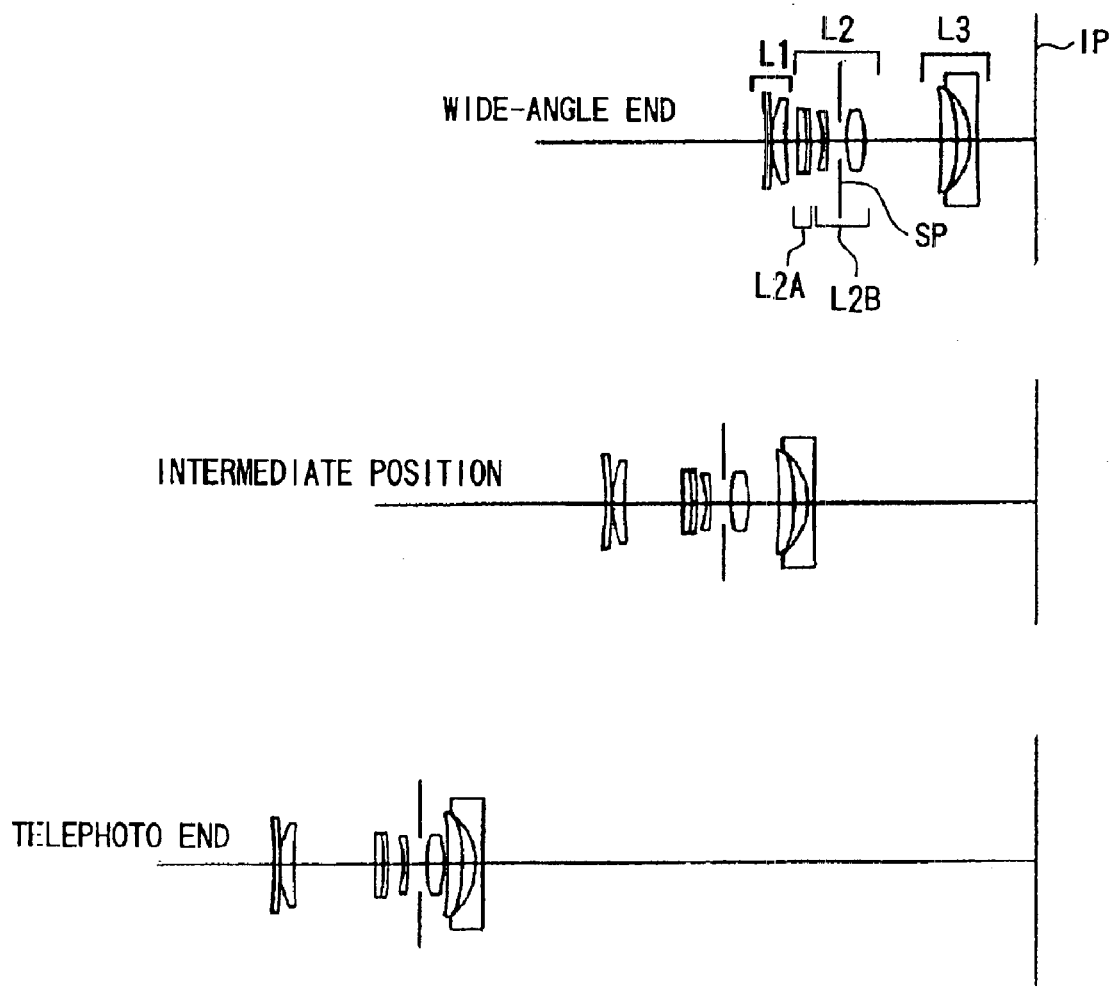
FIG. 19 shows the structure of lenses of a zoom lens system of Numerical Example 4.
Figure 20C:
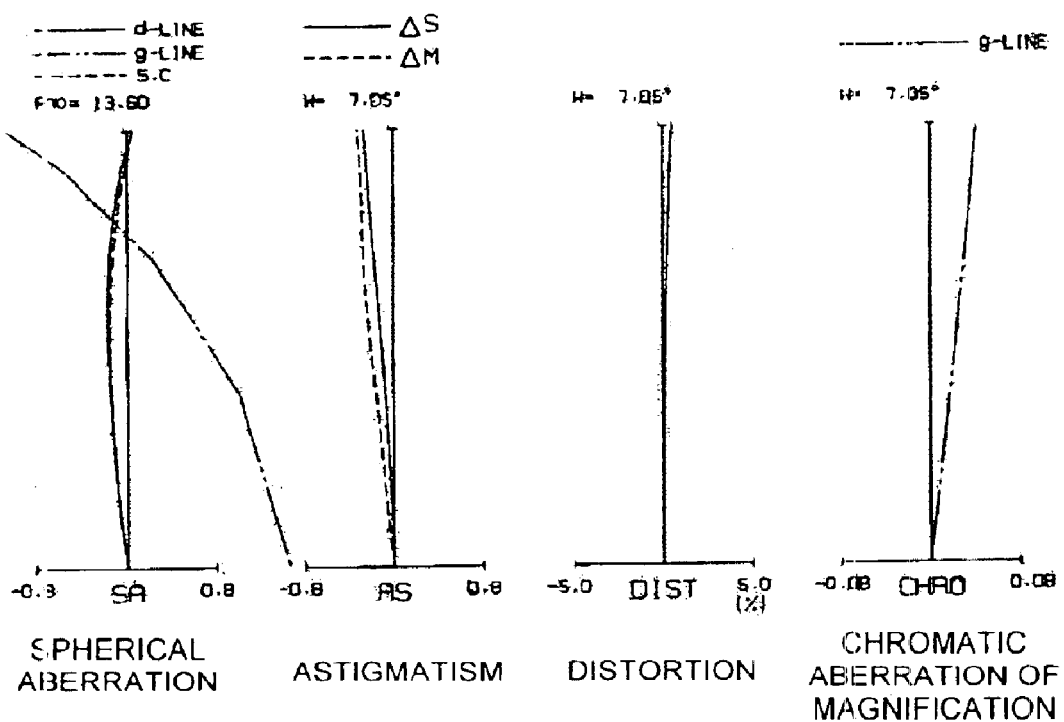
Figure 21A:
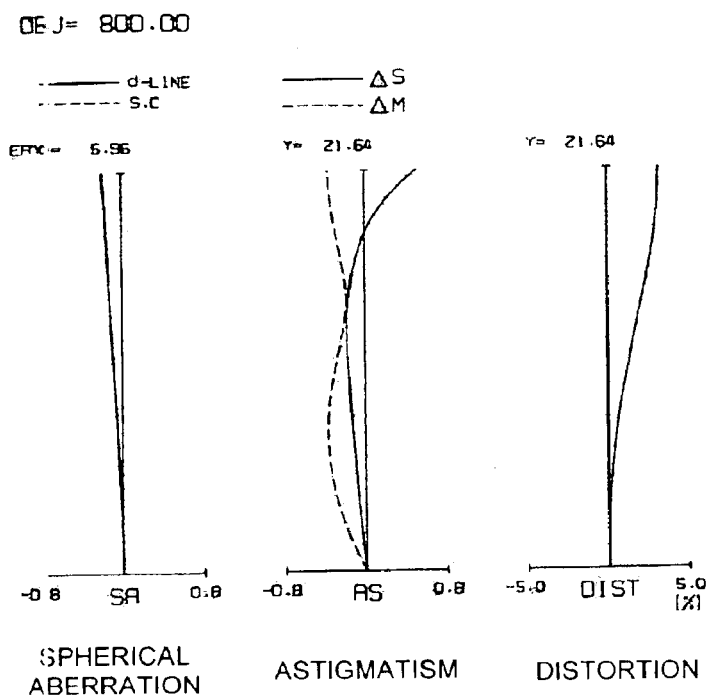
FIGS. 21(A) and 21(B) show various types of aberration in the zoom lens system of Numerical Example 4 at the wide-angle end and telephoto end, respectively, when an object located at a distance of 80 centimeters is brought into focus (in the direct driving method) with the spacing being changed between a first lens subunit and a second lens subunit.
Figure 21B:
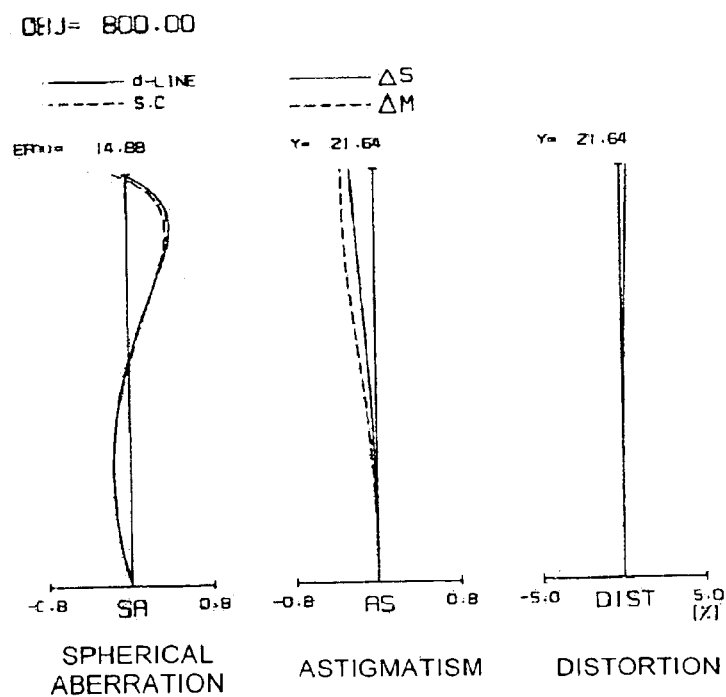
Figure 22A:
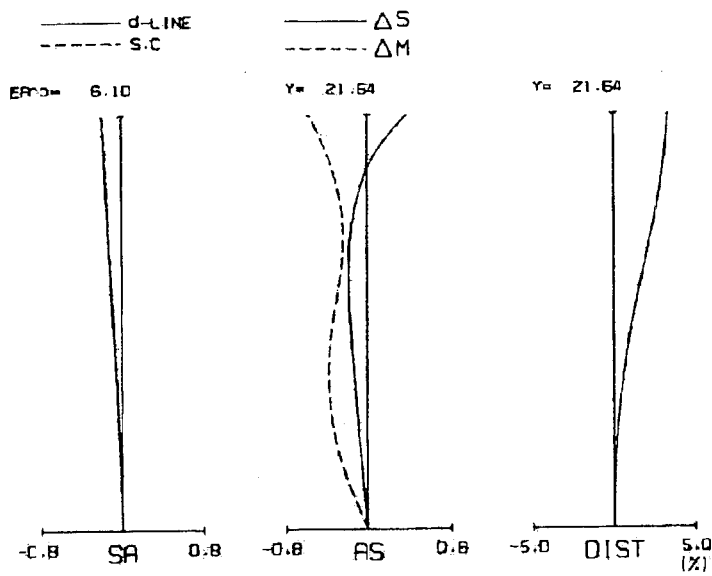
FIGS. 22(A) and 22(B) show various types of aberration in the zoom lens system of Numerical Example 4 at the wide-angle end and telephoto end, respectively, when an object located at a distance of 80 centimeters is brought into focus (in the zoom cam using method) with the spacing being changed between the first lens subunit and the second lens subunit.
Figure 22B:
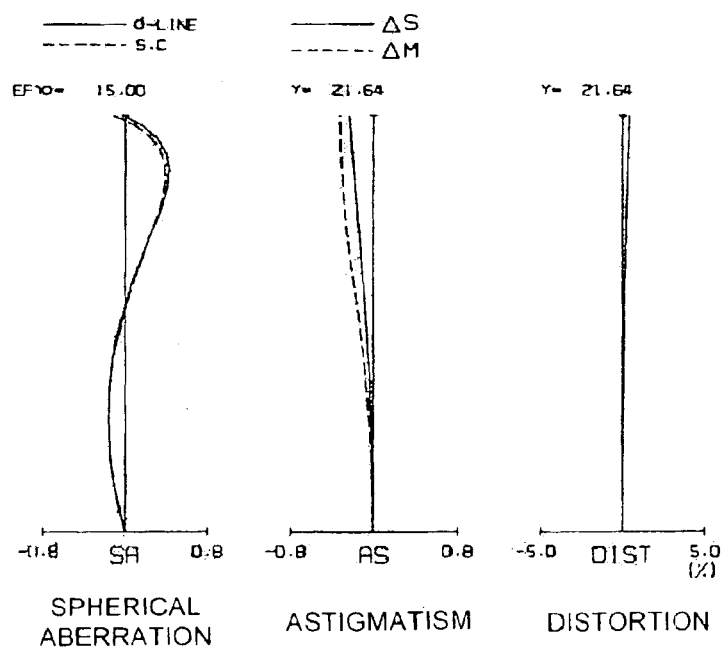
Figure 23A:
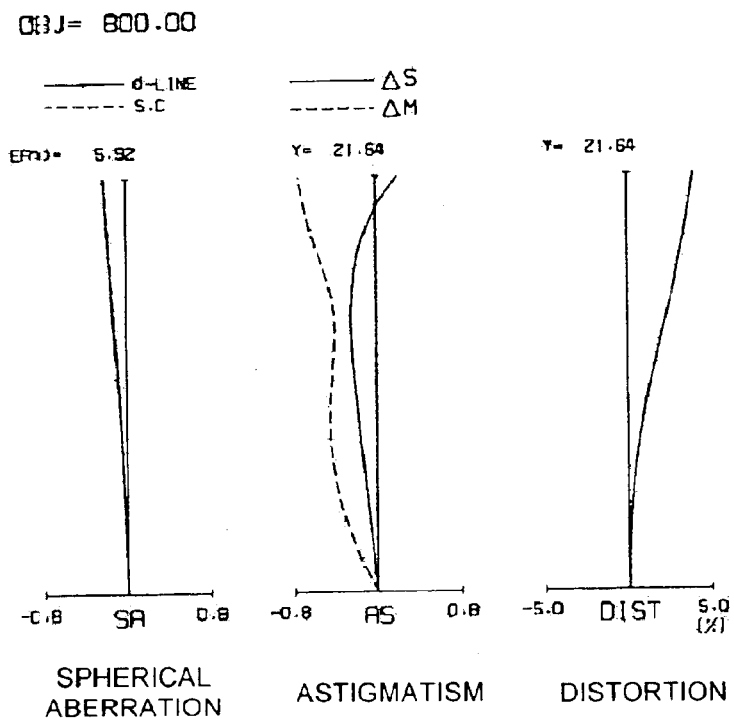
FIGS. 23(A) and 23(B) show various types of aberration in the zoom lens system of Numerical Example 4 at the wide-angle end and telephoto end, respectively, when an object located at a distance of 80 centimeters is brought into focus (in the direct driving method) without changing the spacing between the first lens subunit and the second lens subunit, as a comparative example.
Figure 23B:
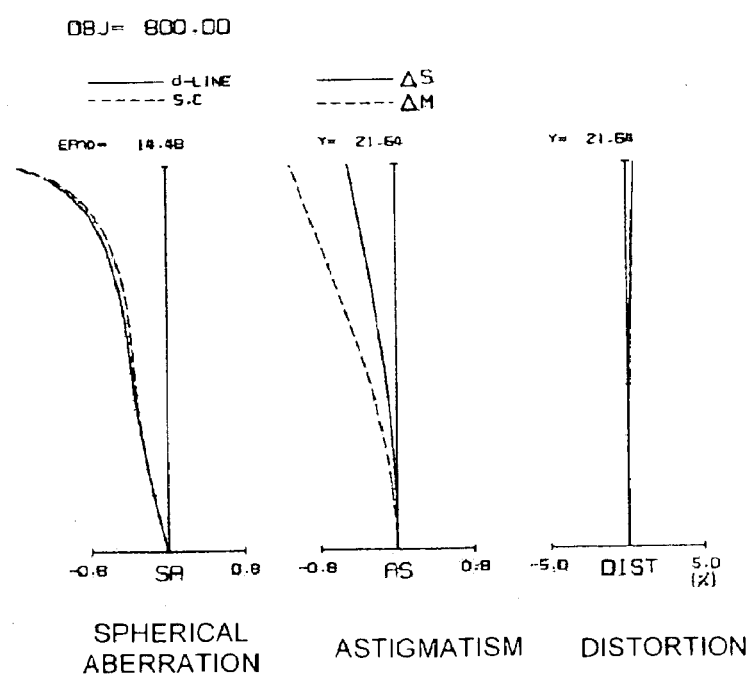
Figure 24A:
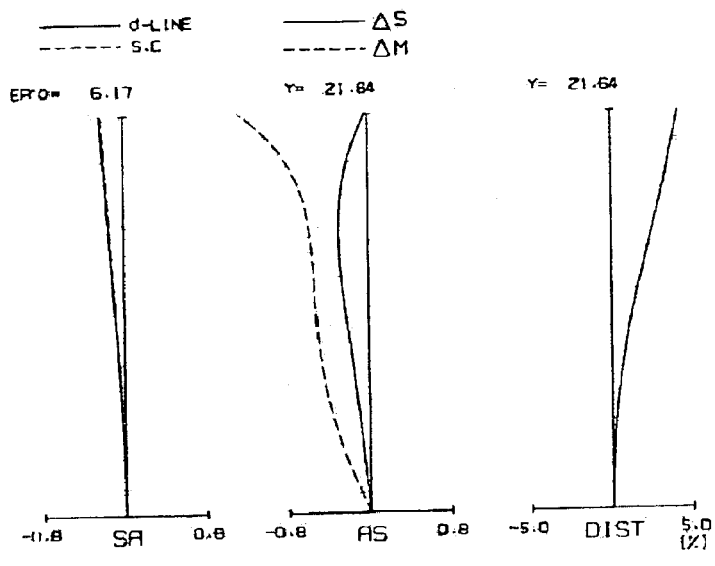
FIGS. 24(A) and 24(B) show various types of aberration in the zoom lens system of Numerical Example 4 at the wide-angle end and telephoto end, respectively, when an object located at a distance of 80 centimeters is brought into focus (in the zoom cam using method) without changing the spacing between the first lens subunit and the second lens subunit, as a comparative example.
Figure 24B:
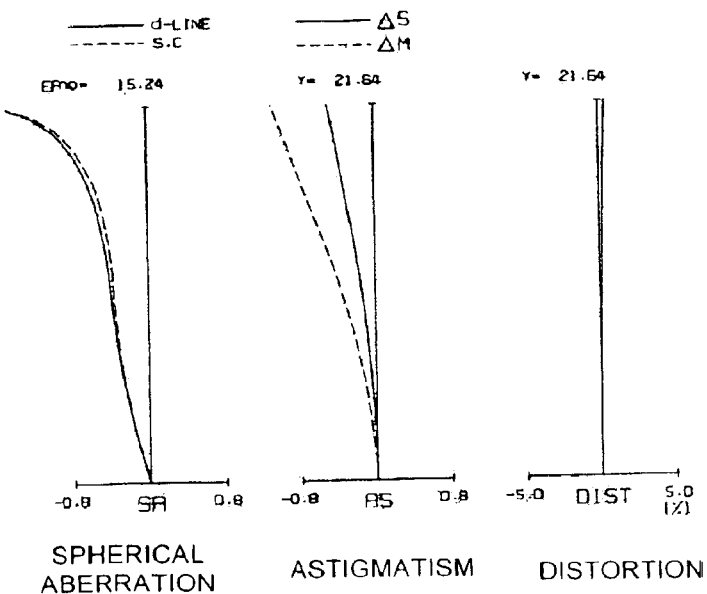
Figure 25:
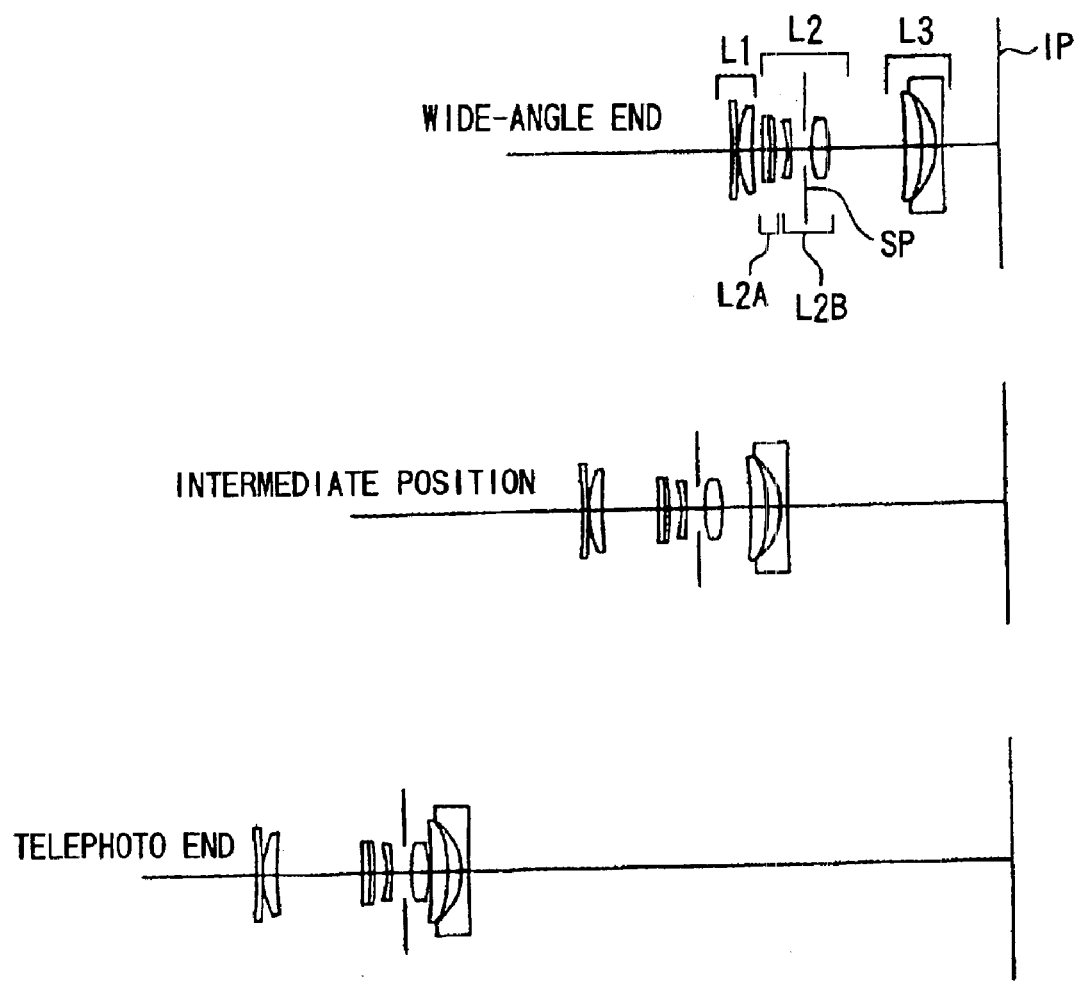
FIG. 25 shows the structure of lenses of a zoom lens system of Numerical Example 5.
Figure 26A:
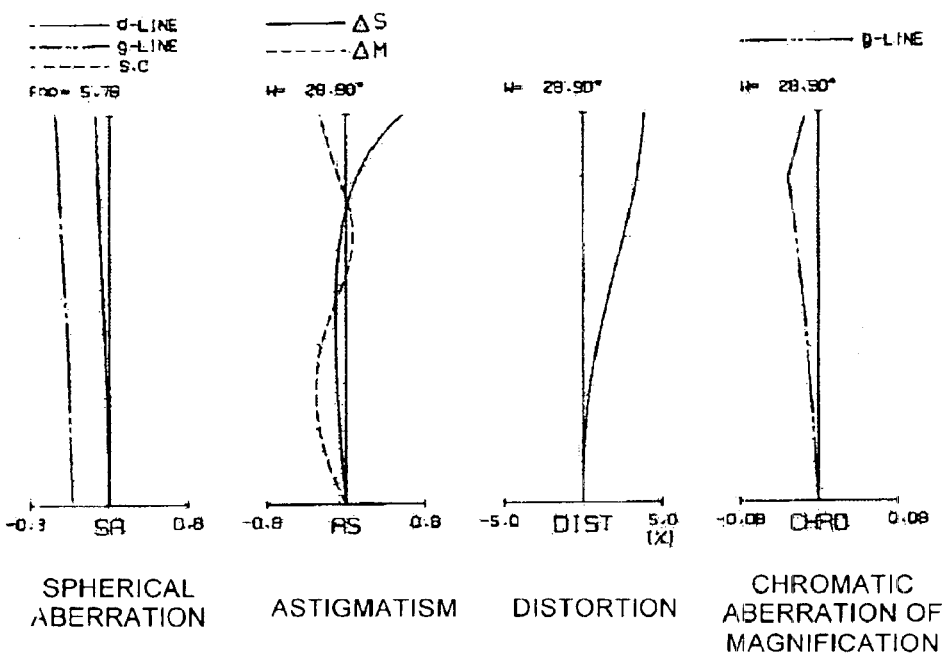
FIGS. 26(A), 26(B), and 26(C) show various types of aberration in the zoom lens system of Numerical Example 5 at the wide-angle end, intermediate zoom position, and telephoto end, respectively, when the zoom lens system is focused on an object at infinity.
Figure 26B:
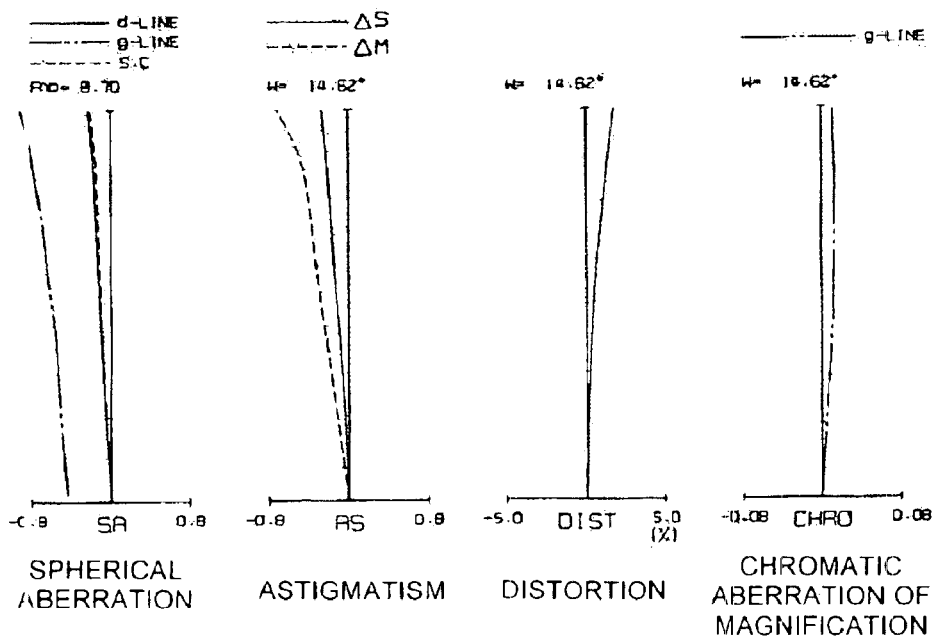
Figure 26C:
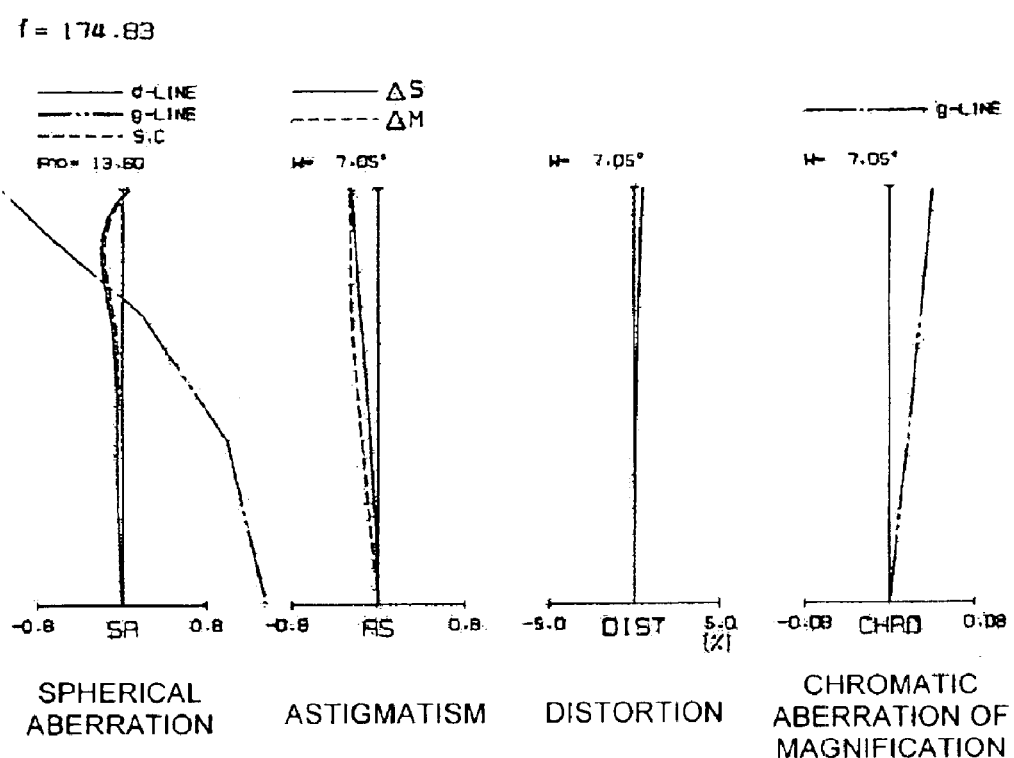
Figure 28A:
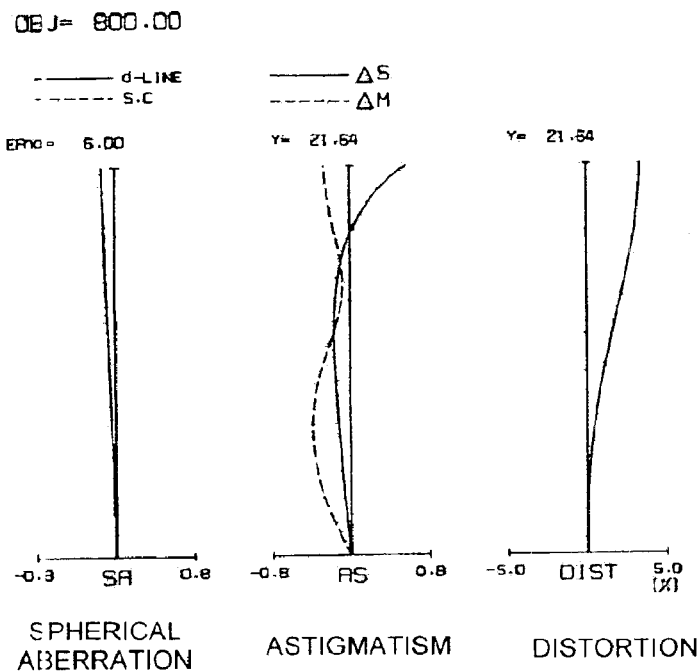
FIGS. 28(A) and 28(B) show various types of aberration in the zoom lens system of Numerical Example 5 at the wide-angle end and telephoto end, respectively, when an object located at a distance of 80 centimeters is brought into focus (in the zoom cam using method) with the spacing being changed between the first lens subunit and the second lens subunit.
Figure 28B:
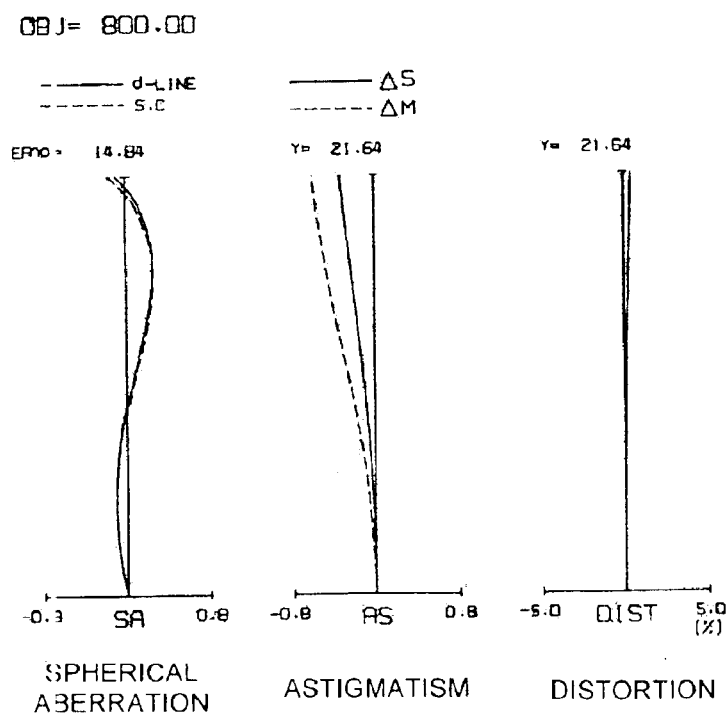
Figure 29A:
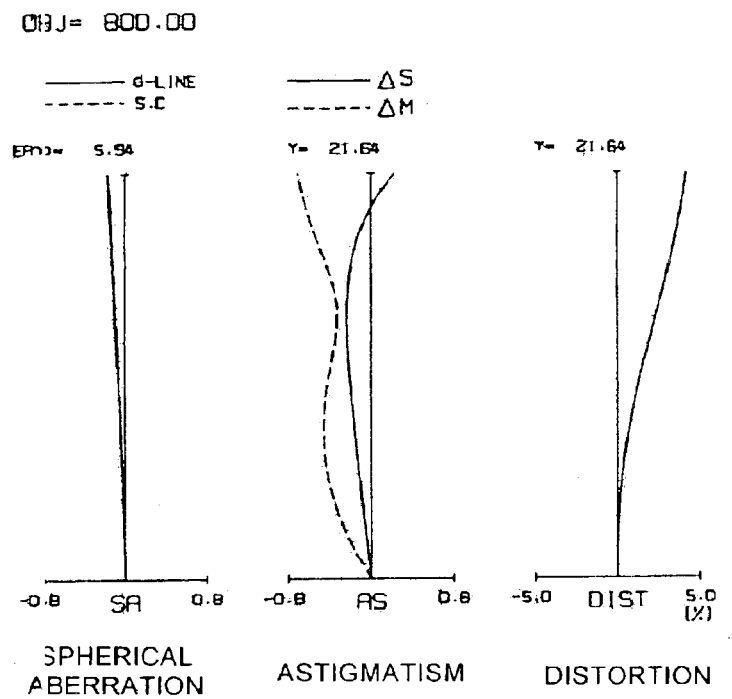
FIGS. 29(A) and 29(B) show various types of aberration in the zoom lens system of Numerical Example 5 at the wide-angle end and telephoto end, respectively, when an object located at a distance of 80 centimeters is brought into focus (in the direct driving method) without changing the spacing between the first lens subunit and the second lens subunit, as a comparative example.
Figure 29B:
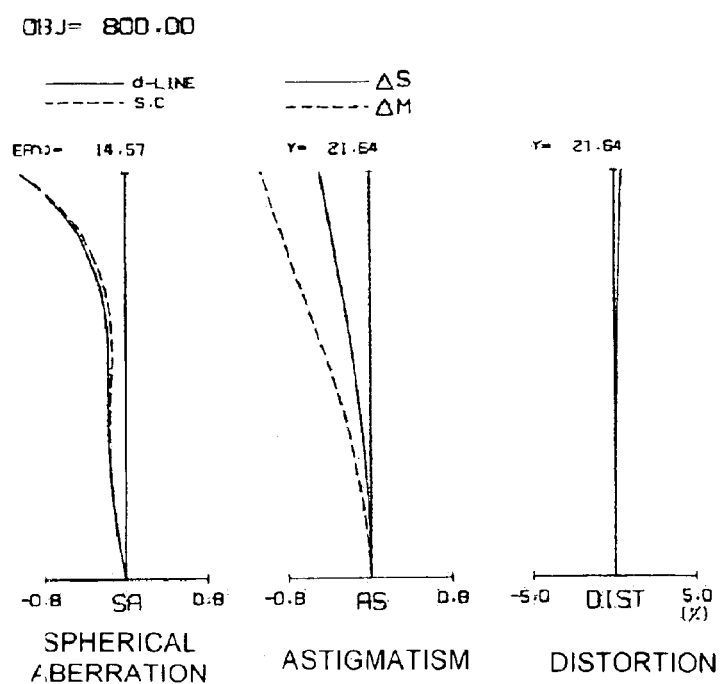
Figure 30A:
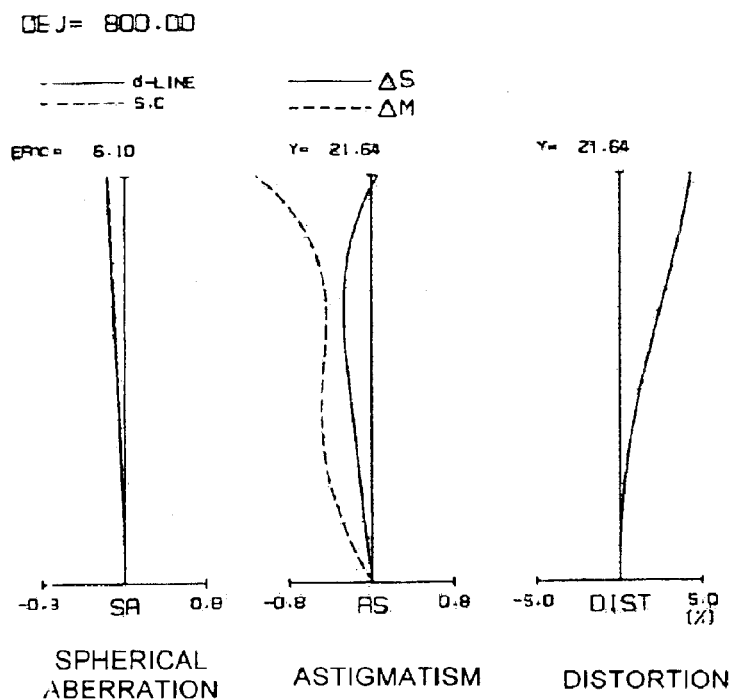
FIGS. 30(A) and 30(B) show various types of aberration in the zoom lens system of Numerical Example 5 at the wide-angle end and telephoto end, respectively, when an object located at a distance of 80 centimeters is brought into focus (in the zoom cam using method) without changing the spacing between the first lens subunit and the second lens subunit, as a comparative example.
Figure 30B:
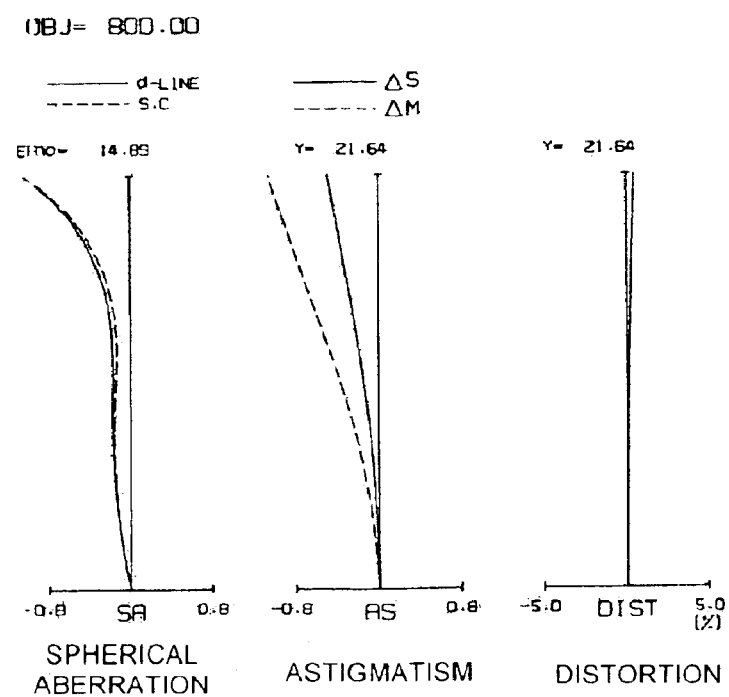

An embodiment of a zoom lens system of the present invention is hereinafter described with reference to the drawings. The zoom lens system disclosed in the embodiment is particularly preferable as an image-taking optical system for a compact camera. The zoom lens system has a zoom ratio of approximately 4.5 and can provide excellent image quality even when images of an object at a short distance are taken.

FIGS. 1, 7, 13, 19, and 25 are section views showing zoom lens systems in Numerical Examples 1 to 5, later described, respectively. In the section views of the lenses, L1 shows a first lens unit having a positive refractive power (that is, an optical power is the reciprocal of a focal length), L2 shows a second lens unit having a positive refractive power as a whole, and L3 shows a third lens unit having a negative refractive power. The second lens unit L2 is formed of a first lens subunit L2A having a positive or negative refractive power and a second lens subunit L2B having a positive refractive power. SP shows an aperture stop, and IP shows an image plane on which a silver haloid film or the like is located.

FIGS. 2, 8, 14, 20, and 26 show various types of aberration when the zoom lens systems in Numerical Examples 1 to 5 are focused on an object at infinity.

The first lens subunits L2A in Numerical Examples 1 to 3 have a negative refractive power, while the first lens subunits L2A in Numerical Examples 4 and 5 have a positive refractive power.

The zoom lens systems of the embodiment perform zooming by changing the spacing between the first lens unit L1 and the second lens unit L2 and the spacing between the second lens unit L2 and the third lens unit L3.

In each of the zoom lens systems of Numerical Examples 1, 2, and 4, the spacing between the first lens subunit L2A and the second lens subunit L2B is also changed during zooming. Specifically, each of the zoom lens systems of Numerical Examples 1 and 2 is a four-unit zoom lens which has lens units having a positive, a negative, a positive, and a negative refractive powers in order from an object side to an image side. The zoom lens system of Numerical Example 4 is a four-unit zoom lens which has four lens units having a positive, a positive, a positive, and a negative refractive powers in order from an object side to an image side.

In each of the zoom lens systems of Numerical Examples 3 and 5, the spacing between the first lens subunit L2A and the second lens subunit L2B is not changed during zooming. Specifically, each of the zoom lens systems of Numerical Examples 3 and 5 is a three-unit zoom lens which has lens units having a positive, a positive, and a negative refractive powers in order from an object side to an image side.

The spacing between the first lens subunit L2A and the second lens subunit L2B is changed during zooming as in the zoom lens systems of Numerical Examples 1, 2, and 4 to allow well-balanced correction of spherical aberration and off-axis aberration. Thus, it can be expected that the zoom lens systems provide higher quality images over the entire zoom range.

In the zoom lens systems of the embodiment, the first lens subunit L2A and the second lens subunit L2B are moved toward the object side to achieve focusing on an object at a short distance from an object at infinity. At least one zoom position in the zoom range, at least the second lens subunit L2B is moved toward the object side to change the air spacing between the first lens subunit L2A and the second lens subunit L2B to achieve focusing on an object at a short distance from an object at infinity.

Thus, the second lens subunit L2B is mainly responsible for the function of correcting the image plane position at the time of focusing. In addition, variations in aberration due to changes in object distance can be reduced by appropriately setting the relative positions of the first lens subunit L2A and the second lens subunit L2B, so that excellent image quality can be realized over the entire object distance range.

Especially at the wide-angle end, it is desirable to move the respective lens units relatively on an optical axis such that the air spacing between the first lens subunit L2A and the second lens subunit L2B is increased during focusing on an object at a short distance from an object at infinity. Since this causes the first lens subunit L2A to approach the first lens unit L1, off-axis rays are incident on peripheral portions of the first lens subunit L2A to positively allow correction of curvature of field.

At the telephoto end, particularly, it is desirable to move at least the second lens subunit L2B such that the air spacing between the first lens subunit L2A and the second lens subunit L2B is reduced during focusing on an object at a short distance from an object at infinity. This enables favorable correction of positive spherical aberration occurring when an object at a finite distance is brought into focus as compared with focusing on an object at infinity.

Figure 31:
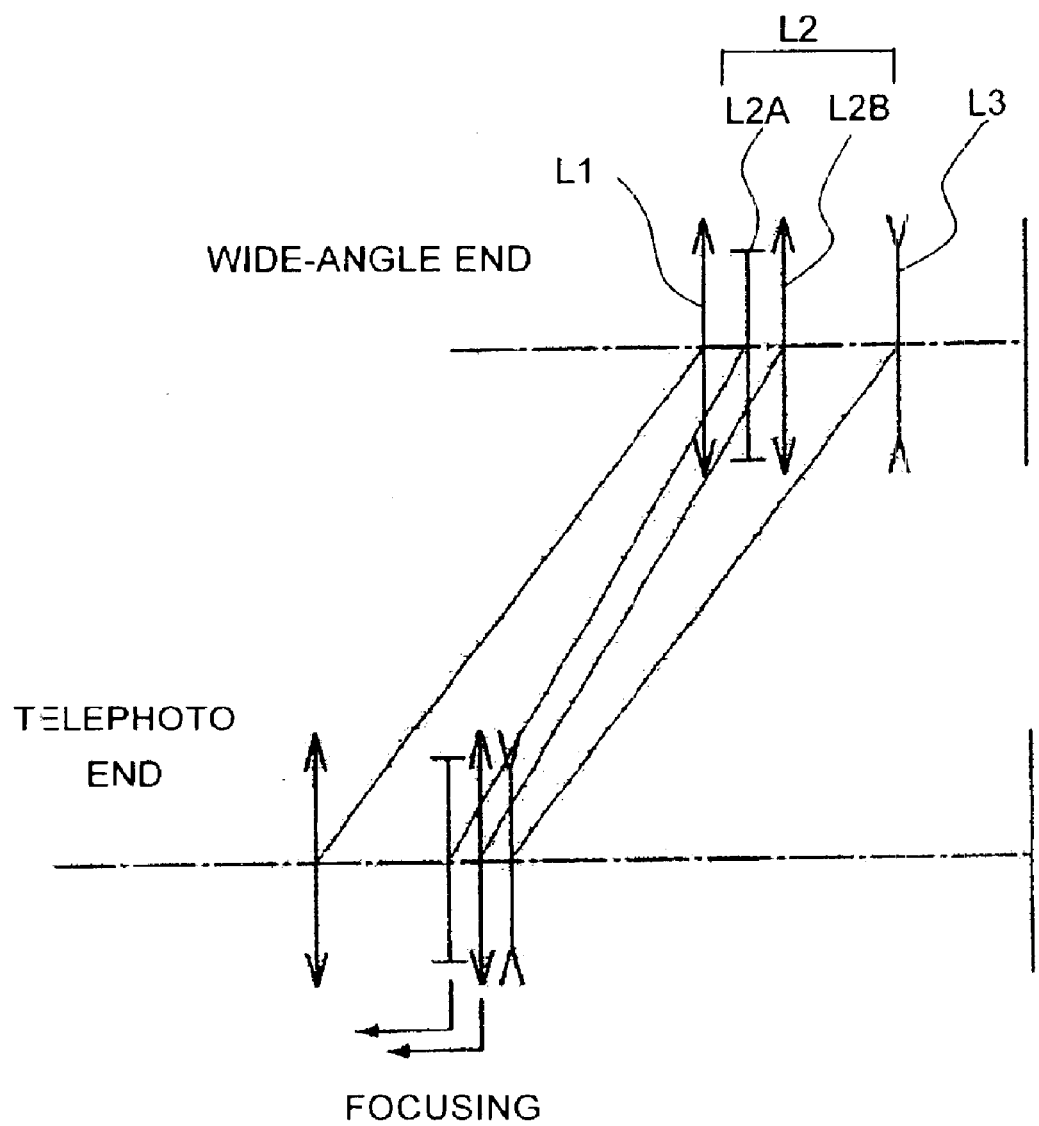
FIG. 31 schematically shows trajectories in zooming and movements in focusing of lenses in a method in which the first lens subunit and the second lens subunit are moved by an electrical means (the direct driving method)
Figure 32:
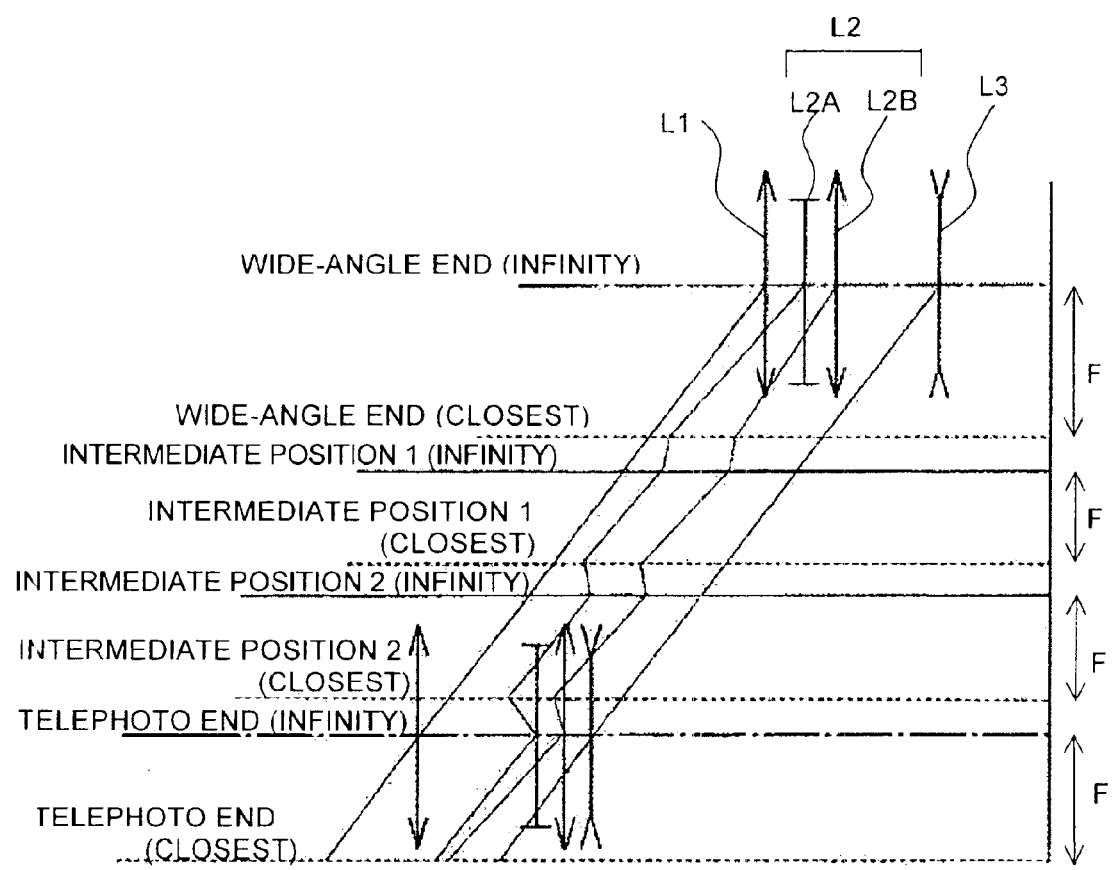
FIG. 32 schematically shows trajectories in zooming and moving trajectories in focusing at respective zoom positions in a method in which the focus lens unit is moved in focusing by using part of a zoom cam.

Methods of moving the lens units during focusing include driving of only the focus lens unit separately with an electrical driving means (a direct driving method), and driving of the focus lens unit by using a cam mechanism which moves each lens unit during zooming (a zoom cam using method). Any of them can be used in the zoom lens systems of the embodiment. FIG. 31 schematically shows loci during zooming and movements during focusing of the respective lens units in the former method. FIG. 32 schematically shows trajectories zooming and moving trajectories in focusing at respective zoom positions in the later method.

In the method shown in FIG. 32, focus cams for a certain zoom position are formed at a region F between an infinite object position at the certain zoom position and an infinite object position at the next zoom position, and the cams are used to achieve focusing on an object at a short distance from an object at infinity at the certain zoom position. In this event, as apparent from FIG. 32, not only the first lens subunit L2A and the second lens subunit L2B, but also the first lens unit L1 and the third lens unit L3 are simultaneously moved on the optical axis. The use of such focusing performed by utilizing part of the driving cam for zooming advantageously realizes a simplified mechanism.

In the embodiment, the first lens unit L1 is formed of a meniscus negative lens having a concave surface toward the object side and a positive lens disposed on the image side of the meniscus negative lens and having a convex surface with a higher refractive power on the object side than on the image side. The first lens unit L1 of the structure described above is used to efficiently correct spherical aberration and distortion.

The first lens subunit L2A has a positive lens and a negative lens for reducing variations of chromatic aberration during zooming. In addition, the positive lens and the negative lens are formed into a cemented lens to provide higher effects of color correction.

The second lens subunit L2B has a lens component (a negative lens or a negative cemented lens) having a negative refractive power on the object side and a positive lens having an aspheric surface on the image side to satisfactorily correct spherical aberration over the entire zoom range. Also, the aperture stop SP is provided in the second lens subunit L2B to reduce the size of the entire zoom lens system and favorably correct off-axis aberration. The aperture stop SP is desirably disposed at a position near the center of the optical system to strike a balance between the front lens diameter and rear lens diameter to provide excellent optical performance.

The third lens unit L3 has a positive lens having an aspheric surface and a negative lens disposed on the image side of the positive lens and having a concave surface with a higher refractive power on the object side than on the image side. This structure enables efficient correction of off-axis aberration to be performed by the small number of the lenses.

Next, description is made for desirable conditions of the zoom lens systems of the embodiment.

To achieve a small optical system which can provide excellent image quality even with a high zoom ratio, it is desirable to satisfy the following expressions at the wide-angle end:

$$0.3 < |F3/Fw| < 0.7 \quad (1)$$

$$1.0 < \beta 3w < 2.0 \quad (2)$$

where Fw represents a focal length of the entire zoom lens system at the wide-angle end, F3 represents a focal length of the third lens unit L3, and β3w represents a lateral magnification of the third lens unit L3 at the wide-angle end. The expressions (1) and (2) relate to the refractive power of the third lens unit L3 at the wide-angle end.

If the negative refractive power of the third lens unit L3 is so low as to result in the value of F3/Fw larger than the upper limit of the expression (1), or if the lateral magnification of the third lens unit L3 at the wide-angle end is so large as to cause the value of β3w larger than the upper limit of the expression (2), the variable magnification action of the third lens unit L3 is reduced during zooming. This inevitably increases the amounts of movement of the respective lens units during zooming to provide a desired zoom ratio, resulting in an increase in the overall length of the lens system. Thus, it is not preferable.

On the other hand, if the lower limit of the expression (1) or (2) is not reached, an action of the telephoto system is increased in the entire lens system to extremely reduce a back focal distance. In addition, the outer diameter of the third lens unit L3 is increased to ensure a certain amount of peripheral light, and at the same time, curvature of field and astigmatism occur. Thus, it is not preferable.

To achieve a reduced size of the lens system and favorable image quality even in image-taking of an object at a short distance, the following expression is preferably satisfied:

$$0.03 < |F2b/F2a| < 0.4 \quad (3)$$

where F2a represents a focal length of the first lens subunit L2A, and F2b represents a focal length of the second lens subunit L2B.

If the positive refractive power of the second lens subunit L2B is so low as to result in the value of F2b/F2a larger than the upper limit of the expression (3), the negative refractive power of the third lens unit L3 must be reduced in order to provide a desired focal length at the wide-angle end. The variable magnification action is reduced in movement over a certain distance during zooming, and at the same time, the amount of movement of the second lens subunit L2B is increased during focusing on an object at a finite distance. As a result, the size of the lens system is increased.

On the other hand, the value of F2b/F2a less than the lower limit is not preferable since the positive refractive power of the second lens subunit L2B is extremely increased to cause significant higher order spherical aberration which is difficult to correct.

Limiting the numerical range of the expression (3) to the following is desirable since the aforementioned effects are provided more prominently:

$$0.03 < |F2b/F2a| < 0.2 \quad (3a)$$

In addition, on the premise that the entire second lens unit L2 has a predetermined focal length, setting may be advantageously made such that the first lens subunit L2A has a negative refractive power and the second lens subunit L2B has a higher positive refractive power in order to reduce the amount of movement of the focus lens unit to achieve a reduced size of the lens system. This can reduce the amount of movement for focusing at a certain finite distance.

In the embodiment, the third lens unit L3 includes a single plastic lens having an aspheric surface, but a plurality of plastic lenses may be used to further reduce cost.

To improve optical performance, another aspheric surface may be used, or a diffractive optical element or a refraction distribution type lens may be used.

It is also possible that the lens units or a portion of the lens units is decentered to correct image position displacement due to camera shake or the like.

Next, numeric data of Numerical Examples 1 to 5 are shown.

In each of Numeric Examples 1 to 5, f represents a focal length, Fno an F number, and ω half of the field angle. Also, i represents the order of an optical surface from the object side, Ri the radius of curvature of an i-th optical surface (an i-th surface), Di a spacing between an i-th surface and an i+1-th surface, Ni and vi the refractive index and the Abbe's number of the material of an i-th optical member for the d line.

An aspheric shape is represented by:

$$x = \frac{(1/R)h^2}{1 + \sqrt{\{1 - (1+k)(h/R)^2\}}} + Ah^2 + Bh^4 + Ch^6 + Dh^7 + Eh^{10}$$

where k represents the conic constant, A, B, C, D, E aspheric coefficients, x a displacement in the optical axis direction at a height h from the optical axis relative to the plane vertex, and R a paraxial radius of curvature. For example, "e-Z" means "$10^{-Z}$."

Table 1 shows numerical values calculated with the aforementioned expressions in the respective Numerical Examples.

Numerical Example 1

| | f = 39.13–174.73 | Fno = 5.76–13.18 | 2ω = 57.9–14.1° | |
|---|---|---|---|---|
| R1 = −33.851 | D1 = 0.90 | N1 = 1.805181 | ν1 = 25.4 |
| R2 = −53.249 | D2 = 0.15 | | |
| R3 = 21.532 | D3 = 2.70 | N2 = 1.487490 | ν2 = 70.2 |
| R4 = −95.618 | D4 = variable | | |
| R5 = −22.243 | D5 = 0.80 | N3 = 1.800999 | ν3 = 35.0 |
| R6 = 84.168 | D6 = 1.80 | N4 = 1.846660 | ν4 = 23.8 |
| R7 = −28.535 | D7 = variable | | |
| R8 = −34.916 | D8 = 2.20 | N5 = 1.516330 | ν5 = 64.1 |
| R9 = −10.225 | D9 = 0.80 | N6 = 1.834000 | ν6 = 37.2 |
| R10 = −31.256 | D10 = 1.48 | | |
| R11 = variable | D11 = 1.20 | | |
| R12 = 60.753 | D12 = 3.10 | N7 = 1.519480 | ν7 = 61.8 |
| * R13 = −14.243 | D13 = variable | | |
| R14 = −56.334 | D14 = 2.70 | N8 = 1.583060 | ν8 = 30.2 |
| * R15 = −29.802 | D15 = 2.73 | | |
| R16 = −10.581 | D16 = 1.20 | N9 = 1.651597 | ν9 = 58.5 |
| R17 = 220.776 | | | |

| | focal length | | |
|---|---|---|---|
| variable separation | 39.13 | 82.68 | 174.73 |
| D4 | 2.35 | 10.00 | 13.76 |
| D7 | 1.02 | 0.90 | 1.54 |
| D13 | 12.75 | 5.23 | 0.82 | aspheric coefficient

| 13-th surface: | k = 0 | A = 0 | B = 5.72717e−05 | C = 2.84551e−07 | D = −9.50949e−09 | E = 1.14519e−10 |
| 15-th surface: | k = 0 | A = 0 | B = −9.52128e−05 | C = −3.93955e−07 | D = 7.34778e−10 | E = −5.70709e−11 |

Numerical Example 2

| | F = 39.08–174.76 | Fno = 5.76–13.18 | 2ω = 57.9–14.1° | |
|---|---|---|---|---|
| R1 = −32.489 | D1 = 0.90 | N1 = 1.846660 | ν1 = 23.9 |
| R2 = −47.759 | D2 = 0.15 | | |
| R3 = 22.054 | D3 = 2.70 | N2 = 1.487490 | ν2 = 70.2 |
| R4 = −92.359 | D4 = variable | | |
| R5 = −24.841 | D5 = 0.80 | N3 = 1.772499 | ν3 = 49.6 |
| R6 = 235.686 | D6 = 1.60 | N4 = 1.755199 | ν4 = 27.5 |
| R7 = −27.374 | D7 = variable | | |
| R8 = −34.607 | D8 = 2.30 | N5 = 1.518229 | ν5 = 58.9 |
| R9 = −9.669 | D9 = 0.80 | N6 = 1.834000 | ν6 = 37.2 |
| R10 = −43.928 | D10 = 1.78 | | |
| R11 = stop | D11 = 1.20 | | |
| R12 = 49.790 | D12 = 3.10 | N7 = 1.583126 | ν7 = 59.4 |
| * R13 = −14.330 | D13 = variable | | |
| R14 = −95.746 | D14 = 2.80 | N8 = 1.583060 | ν8 = 30.2 |
| * R15 = −29.846 | D15 = 2.58 | | |
| R16 = −10.474 | D16 = 1.20 | N9 = 1.712995 | ν9 = 53.9 |
| R17 = 216.915 | | | |

| | focal length | | |
|---|---|---|---|
| variable separation | 39.08 | 82.64 | 174.76 |
| D4 | 3.13 | 10.44 | 13.50 |
| D7 | 0.98 | 0.82 | 1.92 |
| D13 | 12.15 | 5.00 | 0.84 | aspheric coefficient

| 13-th surface: | k = 0 | A = 0 | B = 5.43833e−05 | C = 3.65425e−07 | C = −9.33234e−09 | E = 9.66944e−11 |
| 15-th surface: | k = 0 | A = 0 | B = −1.08577e−04 | C = −4.13973e−07 | D = −8.98172e−10 | E = −5.71439e−11 |

Numerical Example 3

| | f = 39.20–174.48 | Fno = 5.76–13.18 | 2ω = 57.8–14.1° | |
|---|---|---|---|---|
| R1 = −35.689 | D1 = 0.90 | N1 = 1.805181 | ν1 = 25.4 | |
| R2 = −56.236 | D2 = 0.15 | | | |
| R3 = 21.872 | D3 = 2.70 | N2 = 1.487490 | ν2 = 70.2 | |
| R4 = −106.884 | D4 = variable | | | |
| R5 = −22.591 | D5 = 0.80 | N3 = 1.800999 | ν3 = 35.0 | |
| R6 = 88.749 | D6 = 1.80 | N4 = 1.846660 | ν4 = 23.8 | |
| R7 = −27.877 | D7 = 1.32 | | | |
| R8 = −35.528 | D8 = 2.20 | N5 = 1.516330 | ν5 = 64.1 | |
| R9 = −9.968 | D9 = 0.80 | N6 = 1.834000 | ν6 = 37.2 | |
| R10 = −31.609 | D10 = 1.48 | | | |
| R11 = stop | D11 = 1.20 | | | |
| R12 = 68.985 | D12 = 3.10 | N7 = 1.519480 | ν7 = 61.8 | |
| * R13 = −13.819 | D13 = variable | | | |
| R14 = −57.289 | D14 = 2.70 | N8 = 1.583060 | ν8 = 30.2 | |
| * R15 = −30.479 | D15 = 2.73 | | | |
| R16 = −10.654 | D16 = 1.20 | N9 = 1.651597 | ν9 = 58.5 | |
| R17 = 225.539 | | | | |

| | focal length | | |
|---|---|---|---|
| variable separation | 39.20 | 82.48 | 174.48 |
| D4 | 2.35 | 9.76 | 14.21 |
| D13 | 12.75 | 5.34 | 0.90 | aspheric coefficient

| | | | | | | |
|---|---|---|---|---|---|---|
| 13-th surface: | k = 1.18363e−07 | A = 0 | B = 5.55010e−05 | C = 3.08495e−07 | D = −9.39367e−09 | E = 1.14901e−10 |
| 15-th surface: | k = −1.60824e−07 | A = 0 | B = −9.20055e−05 | C = −3.71847e−07 | D = 7.86843e−10 | E = −5.77324e−11 |

Numerical Example 4

| | f = 39.15–174.94 | Fno = 5.76–13.60 | 2ω = 57.9–14.1° | |
|---|---|---|---|---|
| R1 = −63.771 | D1 = 0.90 | N1 = 1.846660 | ν1 = 23.8 | |
| R2 = −115.864 | D2 = 0.15 | | | |
| R3 = 18.211 | D3 = 2.40 | N2 = 1.487490 | ν2 = 70.2 | |
| R4 = 82.119 | D4 = variable | | | |
| R5 = −118.574 | D5 = 1.50 | N3 = 1.805181 | ν3 = 25.4 | |
| R6 = −39.840 | D6 = 0.80 | N4 = 1.834807 | ν4 = 42.7 | |
| R7 = −57.201 | D7 = variable | | | |
| R8 = −14.224 | D8 = 0.80 | N5 = 1.834000 | ν5 = 37.2 | |
| R9 = −41.325 | D9 = 2.17 | | | |
| R10 = stop | D10 = 1.20 | | | |
| * R11 = 25.178 | D11 = 3.00 | N6 = 1.516330 | ν6 = 64.1 | |
| * R12 = −15.433 | D12 = variable | | | |
| * R13 = −123.957 | D13 = 2.60 | N7 = 1.583060 | ν7 = 30.2 | |
| * R14 = −36.063 | D14 = 2.31 | | | |
| R15 = −11.819 | D15 = 1.20 | N8 = 1.712995 | ν8 = 53.9 | |
| R16 = 511.691 | | | | |

| | focal length | | |
|---|---|---|---|
| variable separation | 39.15 | 82.66 | 174.94 |
| D4 | 2.00 | 10.15 | 13.91 |
| D7 | 2.01 | 1.70 | 2.65 |
| D12 | 13.09 | 5.26 | 0.59 | aspheric coefficient

| | | | | | | |
|---|---|---|---|---|---|---|
| 11-th surface: | k = 1.15860e+01 | A = 0 | B = 1.79904e−05 | C = 2.35770e−06 | D = −4.82302e−08 | E = 2.76220e−09 |
| 12-th surface: | k = −4.14162e−01 | A = 0 | B = 1.57084e−04 | C = 4.27373e−06 | D = −9.03446e−08 | E = 4.56037e−09 |
| 13-th surface: | k = 3.72751e+01 | A = 0 | B = −2.10313e−05 | C = 8.77397e−07 | D = −1.15189e−08 | E = −2.44649e−11 |
| 14-th surface: | k = 1.68205e+00 | A = 0 | B = −1.00065e−04 | C = 4.16150e−07 | D = −8.04747e−10 | E = −1.25287e−10 |

Numerical Example 5

| | f = 39.18–174.83 | Fno = 5.76–13.60 | 2ω = 57.8–14.1° | |
|---|---|---|---|---|
| R1 = −70.593 | D1 = 0.90 | N1 = 1.846660 | ν1 = 23.8 |
| R2 = −128.524 | D2 = 0.15 | | |
| R3 = 18.056 | D3 = 2.40 | N2 = 1.487490 | ν2 = 70.2 |
| R4 = 72.766 | D4 = variable | | |
| R5 = −99.500 | D5 = 1.30 | N3 = 1.805181 | ν3 = 25.4 |
| R6 = −40.390 | D6 = 0.70 | N4 = 1.834807 | ν4 = 42.7 |
| R7 = −53.667 | D7 = 2.21 | | |
| R8 = −14.202 | D8 = 0.80 | N5 = 1.834000 | ν5 = 37.2 |
| R9 = −40.691 | D9 = 2.16 | | |
| R10 = stop | D10 = 1.20 | | |
| *R11 = 25.132 | D11 = 3.00 | N6 = 1.516330 | ν6 = 64.1 |
| *R12 = −15.614 | D12 = variable | | |
| *R13 = −129.309 | D13 = 2.90 | N7 = 1.583060 | ν7 = 30.2 |
| *R14 = −34.181 | D14 = 2.31 | | |
| R15 = −11.774 | D15 = 1.20 | N8 = 1.712995 | ν8 = 53.9 |
| R16 = 422.631 | | | |

| | focal length | | |
|---|---|---|---|
| variable separation | 39.18 | 82.93 | 174.83 |
| D4 | 1.97 | 10.09 | 14.70 |
| D12 | 13.09 | 4.97 | 0.36 | aspheric coefficient 11-th surface: k = 1.15856e+01 A = 0 B = 1.89321e−05 C = 2.35471e−06 D = −4.82828e−08 E = 2.66760e−09
12-th surface: k = −4.14522e−01 A = 0 B = 1.59175e−04 C = 4.27353e−06 D = −9.32039e−08 E = 4.56052e−09
13-th surface: k = 3.72751e+01 A = 0 B = −2.09291e−05 C = 8.79812e−07 D = −1.23836e−08 E = −1.76404e−11
14-th surface: k = 1.68201e+00 A = 0 B = −1.00645e−04 C = 4.08676e−07 D = −7.88733e−10 E = −1.24762e−10

TABLE 1

| expression | numerical example 1 | numerical example 2 | numerical example 3 | numerical example 4 | numerical example 5 |
|---|---|---|---|---|---|
| ① \|F3/Fw\| | 0.469 | 0.456 | 0.469 | 0.521 | 0.528 |
| ② β3w | 1.563 | 1.584 | 1.560 | 1.498 | 1.482 |
| ③ \|F2b/F2a\| | 0.138 | 0.076 | 0.100 | 0.285 | 0.275 |

Table 2-1 shows movement amounts of the focus lens unit (the second lens unit L2) when an object located at a distance of 80 centimeters is brought into focus after focusing on an object at infinity by the direct driving method shown in FIG. 31 without changing the spacing between the first lens subunit L2A and the second lens subunit L2B.

Table 2-2 shows movement amounts of the focus lens unit (the second lens unit L2), the first lens unit L1, and the third lens unit L3 when an object located at a distance of 80 centimeters is brought into focus after focusing on an object at infinity by the zoom cam using method shown in FIG. 32 without changing the spacing between the first lens subunit L2A and the second lens subunit L2B.

Table 2-3 shows movement amounts of the focus lens unit (the first lens subunit L2A and the second lens subunit L2B) when an object located at a distance of 80 centimeters is brought into focus after focusing on an object at infinity by the direct driving method shown in FIG. 31 with the spacing being changed between the first lens subunit L2A and the second lens subunit L2B.

Table 2-4 shows movement amounts of the focus lens unit (the first lens subunit L2A and the second lens subunit L2B), the first lens unit L1, and the third lens unit L3 when an object located at a distance of 80 centimeters is brought into focus after focusing on an object at infinity by the zoom cam using method shown in FIG. 32 with the spacing being changed between the first lens subunit L2A and the second lens subunit L2B.

TABLE 2-1

| | numerical example 1 | numerical example 2 | numerical example 3 | numerical example 4 | numerical example 5 |
|---|---|---|---|---|---|
| movement amount of second lens unit at wide-angle end | −1.072 | −1.030 | −1.067 | −1.068 | −1.097 |
| movement amount of second lens unit at telephoto end | −1.921 | −1.826 | −1.888 | −1.745 | −1.800 |

TABLE 2-2

| | numerical example 1 | numerical example 2 | numerical example 3 | numerical example 4 | numerical example 5 |
|---|---|---|---|---|---|
| movement amount of first and third lens units at wide-angle | −1.445 | −0.693 | −1.446 | −1.441 | −0.931 |
| movement amount of second lens unit at | −1.806 | −1.386 | −1.807 | −1.801 | −0.155 |

TABLE 2-2-continued

|  | numerical example 1 | numerical example 2 | numerical example 3 | numerical example 4 | numerical example 5 |
|---|---|---|---|---|---|
| wide-angle end movement amount of first and third lens units at telephoto end | −6.703 | −1.761 | −6.596 | −6.159 | −0.256 |
| movement amount of second lens unit at telephoto end | −8.379 | −3.522 | −8.245 | −7.699 | −0.427 |

TABLE 2-3

|  | numerical example 1 | numerical example 2 | numerical example 3 | numerical example 4 | numerical example 5 |
|---|---|---|---|---|---|
| movement amount of first lens subunit at wide-angle end | −1.655 | −2.435 | −1.613 | −0.188 | — |
| movement amount of second lens subunit at wide-angle end | −1.136 | −1.130 | −1.113 | −1.263 | — |
| movement amount of first lens subunit at telephoto end | −1.120 | −0.634 | — | −0.621 | −1.172 |
| movement amount of second lens subunit at telephoto end | −1.812 | −1.719 | — | −2.029 | −1.953 |

TABLE 2-4

|  | numerical example 1 | numerical example 2 | numerical example 3 | numerical example 4 | numerical example 5 |
|---|---|---|---|---|---|
| movement amount of first and third lens units at wide-angle end | −1.383 | −1.472 | −1.597 | −0.737 | −0.075 |
| movement amount of first lens subunit at wide-angle end | −3.009 | −3.907 | −2.833 | −0.459 | −0.140 |
| movement amount of second lens subunit at wide-angle end | −1.910 | −1.956 | −1.972 | −1.652 | −1.347 |

TABLE 2-4-continued

|  | numerical example 1 | numerical example 2 | numerical example 3 | numerical example 4 | numerical example 5 |
|---|---|---|---|---|---|
| movement amount of first and third lens units at telephoto end | −2.265 | — | — | −0.945 | −0.207 |
| movement amount of first lens subunit at telephoto end | −3.322 | — | — | −1.535 | −1.301 |
| movement amount of second lens subunit at telephoto end | −3.993 | — | — | −2.941 | −2.169 |

FIGS. 3, 9, 15, 21, and 27 show various types of aberration of the zoom lens systems in Numerical Examples 1 to 5 when an object located at a distance of 80 centimeters is brought into focus by the direct driving method shown in FIG. 31 with the spacing being changed between the first lens subunit L2A and the second lens subunit L2B. FIGS. 4, 10, 16, 22, and 28 show various types of aberration of the zoom lens systems in Numerical Examples 1 to 5 when an object located at a distance of 80 centimeters is brought into focus by the zoom cam using method shown in FIG. 32 with the spacing being changed between the first lens subunit L2A and the second lens subunit L2B.

As a comparative example, FIGS. 5, 11, 17, 23, and 29 show various types of aberration of the zoom lens systems in Numerical Examples 1 to 5 when an object located at a distance of 80 centimeters is brought into focus by the direct driving method shown in FIG. 31 without changing the spacing between the first lens subunit L2A and the second lens subunit L2B. Similarly, as a comparative example, FIGS. 6, 12, 18, 24, and 30 show various types of aberration of the zoom lens systems in Numerical Examples 1 to 5 when an object located at a distance of 80 centimeters is in brought into focus by the zoom cam using method shown in FIG. 32 without changing the spacing between the first lens subunit L2A and the second lens subunit L2B.

The comparison between the aberration graphs of the embodiment and the comparative examples reveals that at least the second lens subunit L2B is moved toward the object side to change the spacing between the first lens subunit L2A and the second lens subunit L2B to achieve focusing on an object at a short distance from an object at infinity, thereby favorably correcting, especially off-axis curvature of field, at the wide-angle end, and spherical aberration at the telephoto end.

Figure 33:
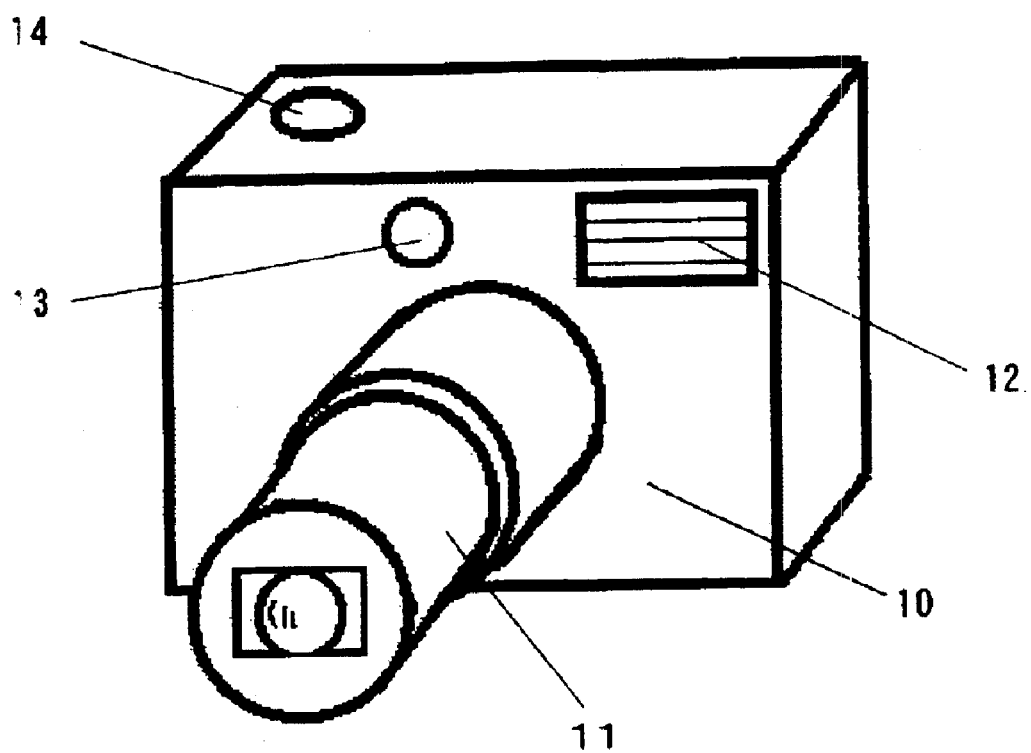
FIG. 33 schematically shows the structure of a compact camera.

Next, description is made for an embodiment of a compact camera of a lens shutter type which employs the zoom lens system of the present invention as an image-taking optical system with reference to FIG. 33.

In FIG. 33, reference numeral 10 shows a compact camera body, 11 an image-taking optical system realized by the zoom lens system of the present invention, 12 an electronic flash contained in the camera body, 13 an external finder system which has an optical axis different from that of the image-taking optical system 11, and 14 a shutter button.

The zoom lens of the present invention can be applied to an optical apparatus such as a lens shutter camera to realize an optical apparatus which has a small size and high optical performance.

While preferred embodiment has been described, it is to be understood that modification and variation of the present invention may be made without departing from the scope of the following claims.

What is claimed is:

1. A zoom lens system comprising in order from an object side to an image side:

a first lens unit having a positive optical power;

a second lens unit having a positive optical power, the second lens unit having, in order from the object side to the image side, a first lens subunit having one of a positive optical power and a negative optical power, and a second lens subunit having a positive optical power; and a third lens unit having a negative optical power, wherein a spacing between the first lens unit and the second lens unit and a spacing between the second lens unit and the third lens unit are changed during zooming, and at least the first lens unit and the third lens unit are moved toward the object side, and in the second lens unit, the second lens subunit is moved toward the object side such that the spacing between the first lens subunit and the second lens subunit is changed during focusing on an object at a short distance from an object at infinity in at least one zoom position.

2. The zoom lens system according to claim 1, wherein the spacing between the first lens subunit and the second lens subunit is increased during focusing on an object at short distance from an object at infinity at a wide-angle end.

3. The zoom lens system according to claim 1, wherein the spacing between the first lens subunit and the second lens subunit is reduced during focusing on an object at a short distance from an object at infinity at a telephoto end.

4. The zoom lens system according to claim 1, wherein the following expressions are satisfied:

$$0.3 < |F3/Fw| < 0.7$$

$$1.0 < \beta 3w < 2.0$$

where Fw represents a focal length of the entire zoom lens system at a wide-angle end, F3 represents a focal length of the third lens unit, and β3w represents a lateral magnification of the third lens unit at the wide-angle end.

5. The zoom lens system according to claim 1, wherein the following expression is satisfied:

$$0.03 < |F2b/F2a| < 0.4$$

where F2a represents a focal length of the first lens subunit, an F2b represents a focal length of the second lens subunit.

6. The zoom lens system according to claim 1, wherein the spacing between the first lens subunit and the second lens subunit is changed during zooming.

7. The zoom lens system according to claim 1, wherein the first lens subunit comprises, in order from the object side to the image side, a neniscus negative lens element which has a concave surface toward the object side and a positive lens element which has a convex surface with a higher optical power on the object side than on the image side.

8. The zoom lens system according to claim 1, wherein the first lens subunit comprises a positive lens and a negative lens.

9. The zoom lens system according to claim 1, wherein the second lens subunit comprises, in order from the object side to the image side, a lens component having a negative optical power, an aperture stop, and a positive lens element having an aspheric surface on the image side.

10. The zoom lens system according to claim 1, wherein the third lens unit comprises, in order from the object side to the image side, a positive lens element having an aspheric surface and a negative lens element having a concave surface with a higher optical power on the object side than on the image side.

11. A camera comprising:

the zoom lens system according to claim 1; and a finder system which has an optical axis different from an optical axis of the zoom lens system.

* * * * *